(12) United States Patent
Tsurume et al.

(10) Patent No.: US 7,510,950 B2
(45) Date of Patent: Mar. 31, 2009

(54) METHOD FOR MANUFACTURING SEMICONDUCTOR DEVICE

(75) Inventors: Takuya Tsurume, Atsugi (JP); Naoto Kusumoto, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 383 days.

(21) Appl. No.: 11/454,878

(22) Filed: Jun. 19, 2006

(65) Prior Publication Data

US 2007/0004082 A1 Jan. 4, 2007

(30) Foreign Application Priority Data

Jun. 30, 2005 (JP) ............................. 2005-192484

(51) Int. Cl.
H01L 21/78 (2006.01)
H01L 21/46 (2006.01)
H01L 21/301 (2006.01)
H01L 21/30 (2006.01)
G06K 19/06 (2006.01)

(52) U.S. Cl. ................ 438/462; 438/460; 438/464; 438/465; 438/463; 438/459; 235/492

(58) Field of Classification Search ................ 438/462, 438/460, 463, 464, 465, 459; 235/492
See application file for complete search history.

(56) References Cited

U.S. PATENT DOCUMENTS 7,208,335 B2   4/2007   Boon et al.

2004/0164302 A1   8/2004   Arai et al.
2005/0062135 A1*  3/2005   Tase et al. ................... 257/620
2005/0168339 A1*  8/2005   Arai et al. ................ 340/572.8
2006/0046435 A1   3/2006   Kida
2007/0004178 A1   1/2007   Tsurume et al.

FOREIGN PATENT DOCUMENTS

| JP | 10-213801 | 8/1998 |
| JP | 2000-117471 | 4/2000 |
| JP | 2004-185779 | 7/2004 |
| JP | 2004-282050 | 10/2004 |
| WO | WO 2006/006611 | 1/2006 |

\* cited by examiner

Primary Examiner—Luan C Thai
(74) Attorney, Agent, or Firm—Eric J. Robinson; Robinson Intellectual Property Law Office, P.C.

(57) ABSTRACT

It is an object of the present invention to provide a method for manufacturing a semiconductor device, which is flexible and superiority in physical strength. As a method for manufacturing a semiconductor device, an element layer including a plurality of integrated circuits is formed over one surface of a substrate; a hole having curvature is formed in part of one surface side of the substrate; the substrate is thinned (for example, the other surface of the substrate is ground and polished); and the substrate is cut off so that a cross section of the substrate has curvature corresponding to a portion where the hole is formed; whereby a laminated body including an integrated circuit is formed. Further, a thickness of the substrate, which is polished, is 2 μm or more and 50 μm or less.

31 Claims, 12 Drawing Sheets

METHOD FOR MANUFACTURING SEMICONDUCTOR DEVICE

BACKGROUND OF THE INVENTION

1. Field of the Invention

The invention disclosed in the present specification relates to a method for manufacturing a semiconductor device. The present invention particularly relates a method for manufacturing a semiconductor device capable of communicating data by wireless communication.

2. Description of the Related Art

In recent years, a semiconductor device capable of communicating data by wireless communication has been actively developed. Such a semiconductor device is called an IC tag, an ID tag, an RF (Radio Frequency) tag, an RFID (Radio Frequency Identification) tag, a wireless tag, an electronic tag, a wireless processor, a wireless memory, a wireless chip, or the like (for example, see Japanese Patent Application Laid-Open No. 2004-282050).

A wireless chip is generally constituted by an antenna and an IC chip, and the IC chip is formed of an element layer including a transistor or the like provided over a silicon wafer. In recent years, a low cost-wireless chip and a wireless chip having flexibility have been desired to be manufactured. This is because the wireless chip may be used by being fixed to a product by being attached to a surface of the product or embedded in the product. In addition, in a case where the wireless chip is fixed by being attached to a product having curvature or flexibility, the wireless chip itself is desired to have flexibility.

As one method for achieving cost reduction, a method in which an element layer is provided over a substrate typified by glass in substitution for a silicon wafer to manufacture a wireless chip can be given.

Further, as a solution of a problem according to flexibility of the wireless chip itself, a method in which a thickness of a substrate over which a wireless chip is formed (including a silicon wafer) is made to be thin (typically, a thickness is 100 µm or less), is given.

SUMMARY OF THE INVENTION

After forming a plurality of chips over a substrate, a wireless chip is usually manufactured by being divided into an individual chip. In this dividing step, there is a problem of causing lack (hereinafter, referred to as "chipping") in an end portion and a corner of the substrate. The problem is particularly remarkable in a case where a substrate is made to be thin. Further, when chipping is caused, a problem in which crack of a glass substrate is easily caused, comes up. As a result, the problem leads reduction of reliability and yield of the wireless chip.

In view of the above problem, it is an object of the present invention to provide a method for manufacturing a semiconductor device, which is flexible and excellent in physical strength.

As a structure of the invention related to a method for manufacturing a semiconductor device disclosed in the present specification, an element layer including a plurality of integrated circuits is formed over one surface of a substrate, and a hole having curvature is formed in part of the one surface side of the substrate. Then, the other surface of the substrate is ground; the other surface of the substrate, which is ground, is polished; and the substrate is cut off so that a cross section of the substrate has curvature corresponding to a portion where the hole is formed; whereby, a laminated body including an integrated circuit is formed.

As another structure of the invention related to a method for manufacturing a semiconductor device disclosed in the present specification, an element layer including a plurality of integrated circuits is formed over one surface of a substrate, and a hole having curvature is formed in part of the one surface side of the substrate by laser irradiation from a top surface of the element layer. Then, the other surface of the substrate is ground; the other surface of the substrate, which is ground, is polished; and the substrate is cut off so that a cross section of the substrate has curvature by laser irradiation from the other surface of the substrate, which is polished, corresponding to a portion where the hole is formed; whereby, a laminated body including an integrated circuit is formed.

As another structure of the invention related to a method for manufacturing a semiconductor device disclosed in the present specification, an element layer including a plurality of integrated circuits is formed over one surface of a substrate, and a hole having curvature is formed in part of the one surface side of the substrate by laser irradiation from a top surface of the element layer. Then, the other surface of the substrate is ground; the other surface of the substrate, which is ground, is polished; and the substrate is cut off so that a cross section of the substrate has curvature by laser irradiation from the other surface of the substrate, which is polished, corresponding to a portion where the hole is formed; whereby a laminated body including an integrated circuit is formed where both sides of the laminated body are sealed with two films having flexibility. Further, a structure in which one side of the laminated body is sealed with a film having flexibility may be employed instead of a structure in which both sides of the laminated body are sealed.

In the above constitution, the laser is an ultraviolet (UV) laser.

In the above constitution, a cross section of the substrate, which is polished, is convex.

In the above constitution, a thickness of the substrate, which is polished, is 2 µm or more and 50 µm or less.

In the above constitution, the element layer has an antenna.

In the present specification, an "element layer" indicates a layer provided with a CPU (Central Processing Unit) and a plurality of integrated circuits such as a memory and a microprocessor, by using at least an element typified by a thin film transistor (TFT). In addition, the element layer can have a mode including an antenna as well as the integrated circuits.

Since a semiconductor device of the present invention has a cross section (hereinafter, it may be referred to as "edge face") of the substrate, of which a thickness is thinner than 100 µm (preferably, 2 µm or more and 50 µm or less), having curvature, chipping and crack from an edge face of a substrate can be prevented from occurring. As a result, a semiconductor device having flexibility and high reliability, which can endure a long-term use, can be provided with high yield. Further, processing a substrate after grinding and polishing the substrate is difficult; however, an opening portion having curvature is formed on one surface side of the substrate before thinning, for example, by using a physical means (in more detail, by grinding and polishing) in the present invention. Therefore, an edge face of the substrate can be easily provided with curvature.

DETAILED DESCRIPTION OF THE INVENTION

Figure 1A:
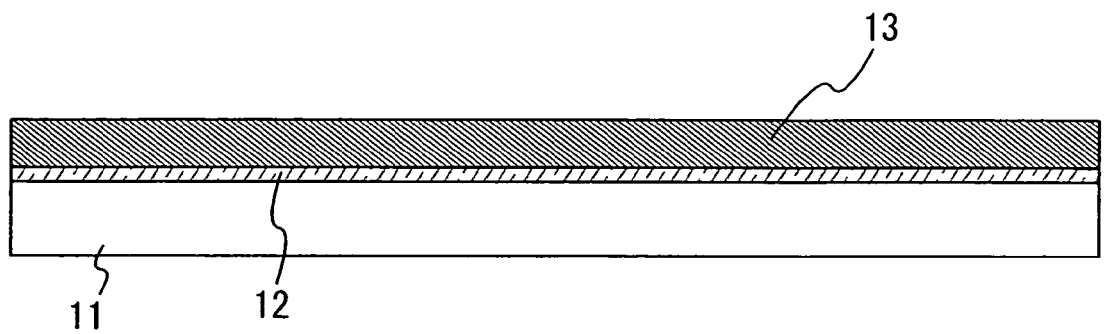
FIGS. 1A to 1C are views showing a method for manufacturing a semiconductor device of the present invention (Embodiment Mode 1).

Embodiment Modes of the present invention will be described with reference to the accompanying drawings below. However, the present invention is not limited to a description below and easily understood by those skilled in the art that various changes and modifications are possible, unless such changes and modifications depart from the purpose and the scope of the invention. Accordingly, the present invention is not construed as being limited to the description of the following Embodiment Modes and Embodiments. It is to be noted that the same portion is denoted by the same reference numeral in all the drawings for describing a structure of the present invention below.

In addition, in the present specification, various conditions of a material and a numeric value are described below; however, these are simply conditions of a material and a numeric value for an object that is to be formed, and it is easily understood by those skilled in the art that some discrepancy in an elemental composition and a physical property value of an object that is formed actually may be generated. Further, it is easily understood by those skilled in the art that a result itself that is measured by various analytical methods also includes discrepancy usually. Accordingly, the present invention is not construed as being limited to the description of the following Embodiment Modes and Embodiments, and the object including some discrepancy compared to conditions of a material and a numeric value described in the present specification is also included in the scope of the present invention.

Embodiment Mode 1

In the present embodiment mode, an example of a structure of a method for manufacturing a semiconductor device of the present invention will be described with reference to drawings.

First, a base film 12 is formed over one surface of a substrate 11 (FIG. 1A). When pollution from the substrate is concerned, the base film 12 is preferably formed over the substrate 1; however, the base film 12 is not always necessary to be provided. It is to be noted that "one surface of the substrate 11" indicates a surface of a side provided with the base film 12 and an element layer 13 formed afterward in the present specification.

The substrate 11 can be made of glass, quartz, silicon, metal, ceramic, stainless, plastic, acryl, or the like. However, a glass substrate is preferably used. When a glass substrate is used, an area and a shape thereof are not limited particularly. Therefore, in a case of using a glass substrate as the substrate 11, it is possible to easily use a rectangular substrate of which one side is, for example, one meter or more, and productivity can be remarkably improved. This point is a great advantage as compared to a case of using a circular silicon substrate. From view of the cost of the substrate itself, a glass substrate is more preferable than a quartz substrate, a silicon substrate, a metal substrate, a ceramic substrate, a stainless substrate, or the like. In a case where upsizing of a substrate is demanded, concern of cost is particularly remarkable. Also, in terms of productivity, a glass substrate is preferably used. In the present embodiment mode, a glass substrate is used as the substrate 11.

The base film 12 may be provided as a single layer or a stacked layer of a plurality of films. The base film 12 has a function of preventing alkali metal such as sodium (Na) included in the glass substrate or the like from entering an element such as a thin film transistor included in the element layer 13 formed afterward.

The base film 12 can be formed by a sputtering method, a plasma CVD method, or the like, using a single layer structure of an insulating film containing at least oxygen or nitrogen such as a silicon oxide film (a SiOx film), a silicon nitride film (a SiNx film), a silicon oxide film containing nitrogen (a $SiN_xO_y$ film) (x>y) (x and y are positive integer numbers), or a silicon nitride film containing oxygen (a $SiN_xO_y$ film) (x>y) (x and y are positive integer numbers); or a stacked layer structure of these insulating films. For example, when the base film 12 is provided to have a two-layer structure, a silicon nitride film containing oxygen may be formed as an insulating film of a first layer, and a silicon oxide film containing nitrogen may be formed as an insulating film of a second layer. In the present embodiment mode, the base film 12 is formed to have a two-layers structure of a silicon nitride film containing oxygen and a silicon oxide film containing nitrogen formed over the silicon nitride film containing oxygen.

Figure 1B:
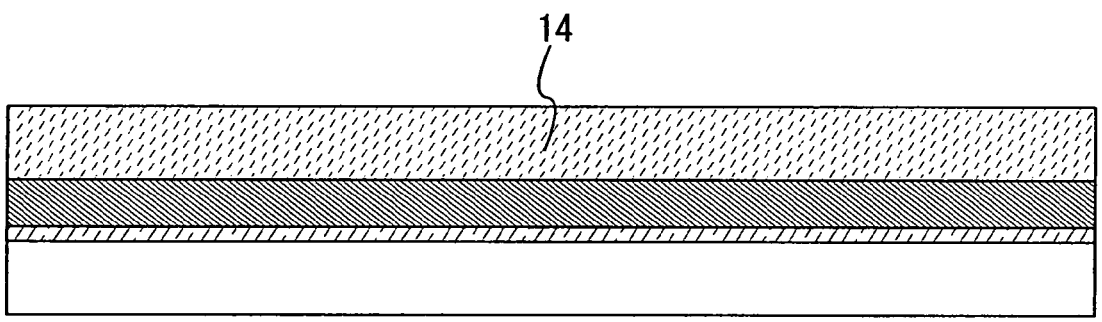

Next, a layer 13 provided with a plurality of integrated circuits having an element such as a thin film transistor (hereinafter referred to as "element layer 13") is formed over the base film 12. Subsequently, an insulating film 14 is formed to cover the base film 12 and the element layer 13 (FIG. 1B). Since the insulating film 14 has a function as a protective layer for securing strength of the element layer 13, the insulating film 14 may be hereinafter referred to as a "protective layer" in the present specification. The insulating film 14 is preferably formed to also cover sides of the base film 12 and the element layer 13. In the present embodiment mode, the insulating film 14 is formed to cover an entire surface of the base film 12 and the element layer 13; however, the insulating film 14 is not necessary to be provided over the entire surface, and may be selectively provided. Further, in a structure of the present embodiment mode, the insulating layer 14 is provided; however, when a structure where the insulating film 14 is not provided is employed, the present invention can be implemented.

The element layer 13 includes a plurality of integrated circuits. The plurality of the integrated circuits is individually divided afterward to be part of a semiconductor device (chip). That is, the subsequent semiconductor device (chip) includes a layer provided with at least the integrated circuit. The integrated circuit includes at least an element typified by a thin film transistor (TFT), resistance, or the like. By using the element, various integrated circuits such as a CPU, a memory and microprocessor can be formed. Further, the element layer 13 can employ a mode including an antenna as well as the element such as the thin film transistor. For example, an integrated circuit constituted by a thin film transistor can perform operation using an alternating current voltage generated in an antenna, and transmit an electromagnetic wave or an electric wave to a reader/writer by modulating the alternating current voltage that is applied to the antenna. The antenna may be formed along with the thin film transistor. Alternatively, the antenna may be formed separately with the thin film transistor, and provided to be electrically connected to the thin film transistor afterward. In a case where the antenna is formed separately with the thin film transistor, it is preferable to employ a structure where the insulating film 14 is not formed over the element layer 13 in order to electrically connect the antenna and the thin film transistor easily in the subsequent step.

The insulating film 14 is formed of a film containing carbon such as DLC (diamond like carbon), a silicon oxide film containing nitrogen, a silicon nitride film containing oxygen, a film made of an organic material (for example, a resin material such as epoxy), or the like. As a method for forming the insulating film 14, a sputtering method, various types of a CVD method such as a plasma CVD method, a spin coating method, a droplet discharging method, a printing method, or the like can be used.

Figure 1C:
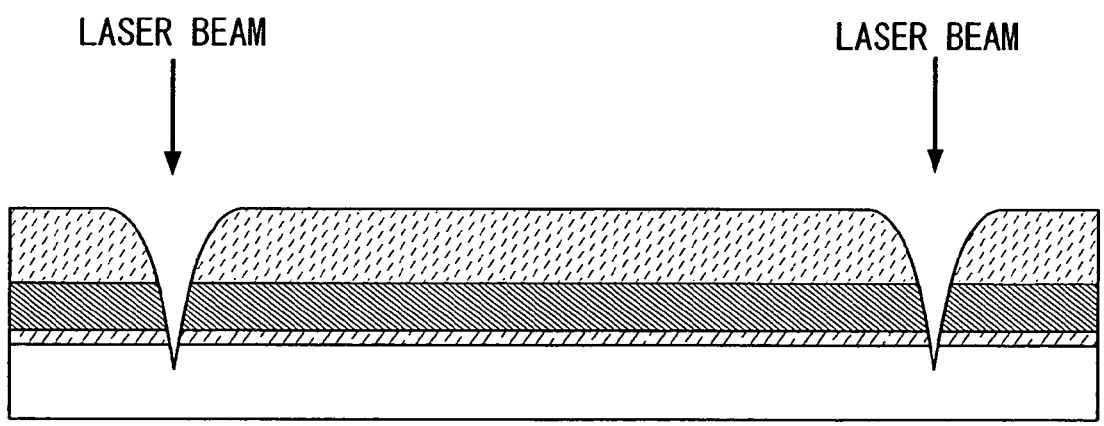

Next, an opening portion (also called a "cut" or a "hole") having curvature with respect to the substrate 11, the base film 12, the element layer 13, and the insulating film 14 is formed (FIG. 1C). The opening portion having curvature indicates an opening portion of which a cross-sectional area is changed (preferably, changed continuously) in a case of cutting the opening portion perpendicularly with respect to a depth of the opening portion. For example, it is preferable to form the opening portion so that the cross-sectional area becomes smaller as the depth of the opening portion becomes deeper as shown in FIG. 1C. Further, the opening portion is formed to prevent a region provided with the thin film transistor or the like constituting the element layer 13, or formed in an edge face of the substrate 11. In the present invention, it is important to form an opening portion having curvature in part of one surface side of the substrate 11 before performing grinding and polishing steps of the substrate 11. A substrate that is ground and polished is made to be thin, and processing thereof is difficult. However, in the present invention, an opening portion (hole) having curvature is formed in one surface side of the substrate before grinding and polishing steps; therefore, curvature on edge faces of the substrate can be easily made.

As a method for forming an opening portion, a method of laser beambeam (also referred to as laser beam, for example, an ultraviolet (UV) laser (a laser of which a wavelength is in an ultraviolet region)) irradiation can be used. Conditions of laser beam are not particularly limited. Laser beam of which absorption coefficient is large with respect to materials used for the base film 12, the element layer 13, and the insulating film 14 is preferably used. It is to be noted that a method other than laser beam irradiation may be used as far as an opening portion as shown in FIG. 1C is formed.

Figure 2A:
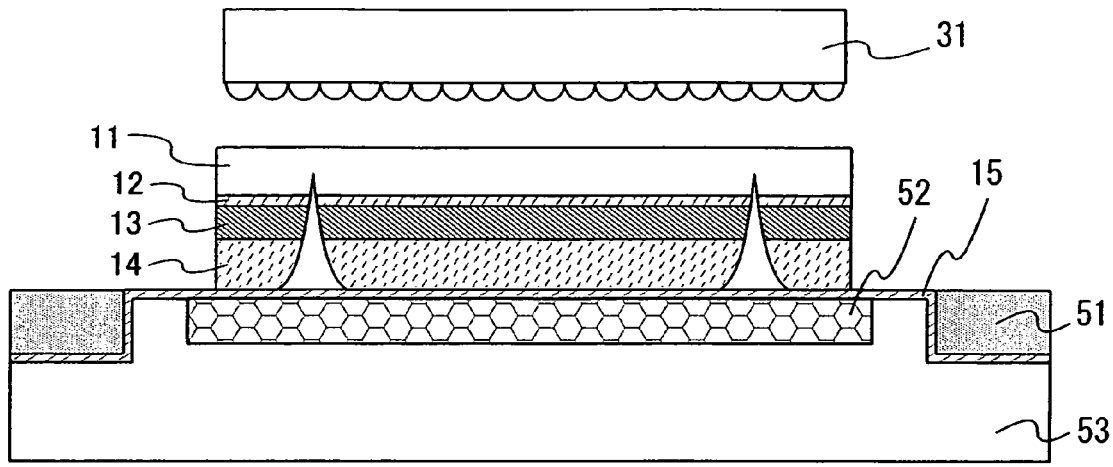
FIGS. 2A to 2C are views showing a method for manufacturing a semiconductor device of the present invention (Embodiment Mode 1).

Next, the substrate 11 is thinned, for example, by using a physical means. In more detail, the other surface of the substrate 11 is ground by a grinding means 31 (FIG. 2A). At this time, the substrate 11 is ground to have a thickness of 100 μm or less. In this grinding step, the other surface of the substrate 11 is generally ground by turning around one or both of a stage 53 to which the substrate 11 is fixed and the grinding means 31. The grinding means 31 corresponds to, for example, a grindstone. It is to be noted that "the other surface of the substrate 11" indicates an opposite surface to a surface provided with the base film 12 and the element layer 13, which is ground by the grinding means 31 in the present specification.

In the present embodiment mode, grinding is performed by using a jig as shown in FIG. 2A in the grinding step. First, a film 15 is attached to cover the insulating film 14. Then, the film 15 is attached to a frame 51. Attachment order of the film 15 and the frame 51 may be reverse; however, it is preferable that attaching the film 15 to the insulating film 14 and to the frame 51 be performed concurrently.

The film 15 is used to fix the substrate when grinding and polishing the substrate 11, and separated from the insulating film 14 in the subsequent step. Therefore, a film having a property that adhesive force is strong in a normal state and adhesive force becomes lower by light irradiation, is preferably used as the film 15. Specifically, a UV tape of which adhesive force becomes lower by ultraviolet ray irradiation may be used. In other words, the film 15 and the insulating film 14 can be easily separated in the subsequent step by using the UV tape as the film 15. Further, a film having a property of stretching by being pulled (called an "expand film") is also preferably used. For example, a vinyl chloride resin, a silicon resin, or the like may be used as the film 15.

Then, the film 15 to which the substrate 11 is attached is provided over an adsorption jig. At this time, the film 15 is set so that the one surface of the substrate 11 is positioned in a higher portion than one surface of the frame 51. The adsorption jig is constituted by, for example, a porous chuck 52 and the stage 53. The porous chuck 52 is made from a porous material, and includes a vacuum chuck mechanism. Thereafter, the other surface of the substrate 11 is ground by the grinding means 31 as mentioned above. Through the above step, the grinding of the substrate 11 is finished.

Figure 2B:
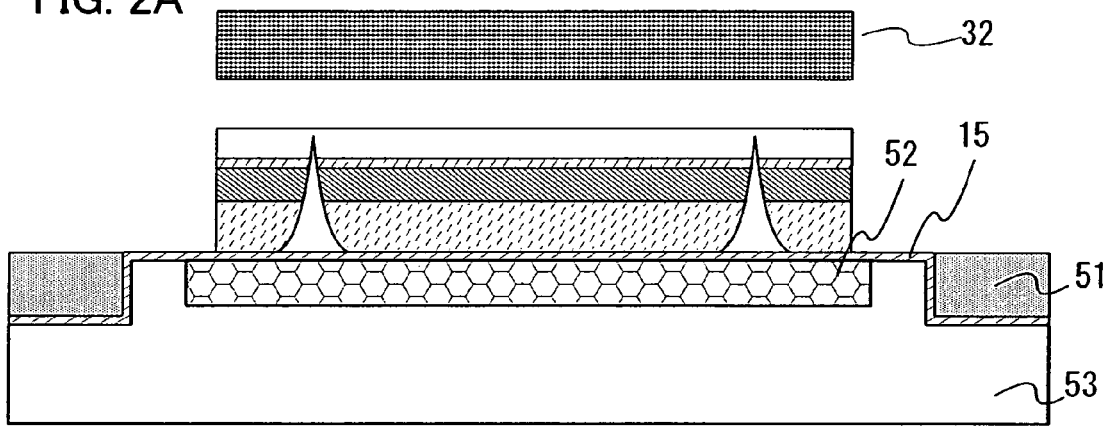

Next, for example, the other surface of the substrate 11 is polished by a polishing means 32 with the film 15 set to which the substrate 11 is attached over the adsorption jig used in the grinding step (FIG. 2B). The substrate 11 is polished to have a thickness of thinner than 100 μm, preferably, 2 μm or more and 50 μm or less (more preferably, 4 μm or more and 30 μm or less). By thinning (for example, grinding and polishing) the substrate 11 in such a manner, the substrate 11 has flexibility. Then, a semiconductor device having flexibility can be manufactured without using a method for peeling an element layer from the substrate 11. In this polishing step, similarly to the above grinding step, the surface of the substrate 11 is polished by turning around one or both of the stage 53 to which the substrate 11 is fixed and the polishing means 32. The polishing means corresponds to, for example, a polishing pad. Thereafter, in order to remove dust generated by the grinding and polishing steps, cleaning is performed as needed. Further, after cleaning, a drying step may be performed.

Figure 2C:
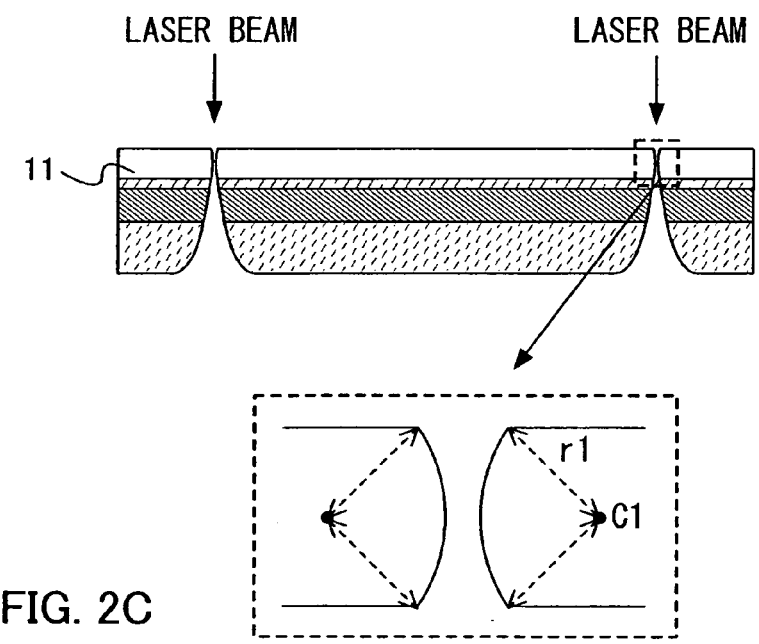
Figure 12:
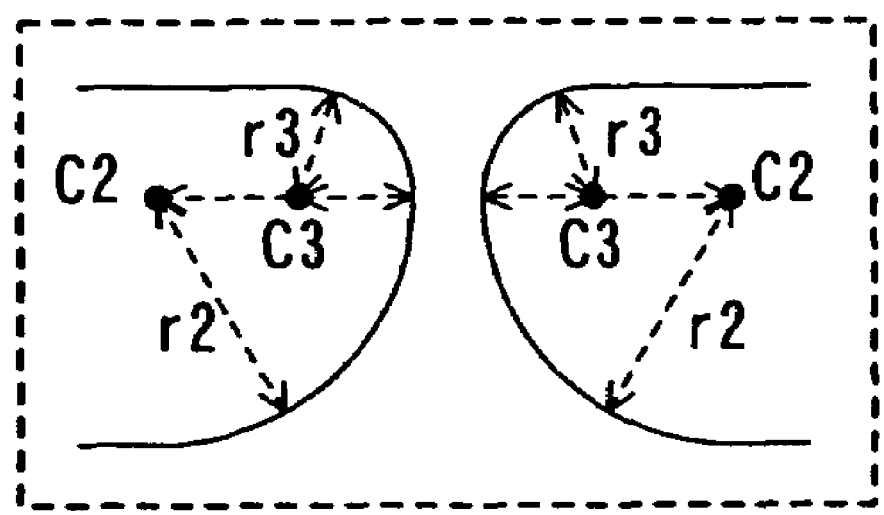
FIG. 12 is a view showing a method for manufacturing a semiconductor device of the present invention (Embodiment Mode 1).

Next, a region corresponding to a portion where the opening portion (hole) is formed is irradiated with laser beam from the other surface of the substrate 11 to cut off boundaries of integrated circuits (between integrated circuits) (FIG. 2C). At this point, it is important in the present invention to cut off the boundaries so that an edge face of the substrate 11 becomes a shape having curvature. Preferably, by cutting off edge faces of the substrate so as to have convexity, generation of chipping and crack can be suppressed maximally. In an enlarged view of the cross section of the substrate 11 as shown in FIG. 2C, a structure is shown, in which the cross section of the substrate 11 has a center C1 of a curvature radius r1. However, as shown in FIG. 12, a structure may be employed, in which a center C2 of a curvature radius r2 of a hole in a case of forming the hole having curvature is made different from a center C3 of a curvature radius r3 of a cross section formed in a case of laser beam irradiation from the other surface of the substrate 11 to a region corresponding to a portion where the hole is formed. Further, elements provided in the element layer 13 are not cut off, and an insulating film provided in the element layer 13 is cut off. In such a manner, the element layer 13 (a layer including a plurality of integrated circuits) is separated into individual integrated circuits, and a plurality of laminated bodies 16 each including an integrated circuit are formed.

Figure 3A:
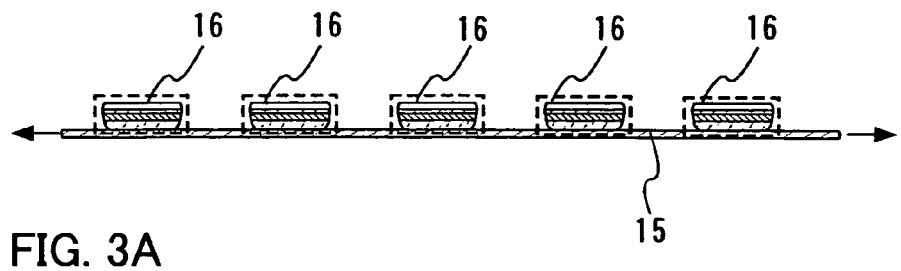
FIGS. 3A to 3D are views showing a method for manufacturing a semiconductor device of the present invention (Embodiment Mode 1).
Figure 3B:
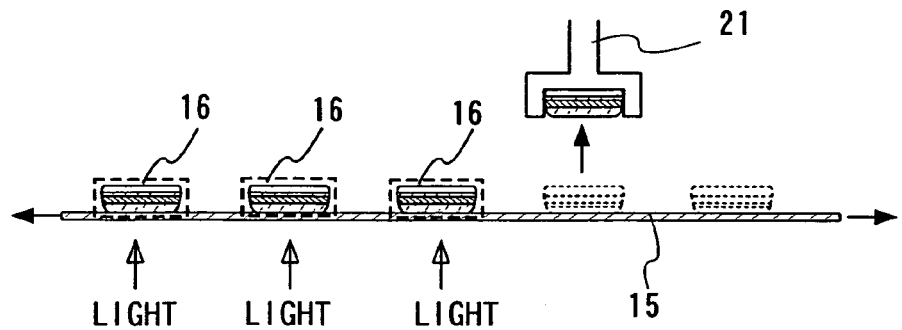

Then, in order to form gaps between the laminated bodies 16 including an integrated circuit, the film 15 is stretched (FIG. 3A). At this point, the film 15 is preferably pulled evenly in a parallel direction to the surface for making each gap equally between the laminated bodies 16 including an integrated circuit. Subsequently, the film 15 is irradiated with light (FIG. 3B). For example, in a case where the film 15 is a UV tape, the film 15 is irradiated with an ultraviolet radiation. By irradiating the film 15 with light, adhesive force of the film 15 is lowered, and adhesion between the film 15 and the laminated bodies 16 including an integrated circuit is lowered. Then, the laminated bodies 16 including an integrated circuit can be separated from the film 15 by physical means.

It is to be noted that the physical means is a means recognized by physics in the present specification. Specifically, the physical means indicates a dynamics means or a mechanical means having a process that can be applied to Laws of Dynamics and a means for changing some sort of dynamic energy (mechanical energy). That is, peeling by using the physical means is to perform peeling by an external shock (stress) using pressure of a gas emitted from a nozzle, ultrasonic waves, a load using a wedge-shaped member, or the like.

In the above step, after the step for stretching the film 15, the step for irradiating the film 15 with light is performed; however, the present invention is not limited to this order. After the step for irradiating the film 15 with light, the step for stretching the film 15 may be performed.

Next, sealing treatment is performed by using a base (film) as needed. The sealing treatment has two types of methods. First, a first method is described.

In the first method, first, the laminated body 16 including an integrated circuit is separated from the film 15 by using a pick up means 21. Subsequently, in order to attach one surface of the laminated body 16 including an integrated circuit to a first base 18, the laminated body 16 including an integrated circuit is set over the first base 18 by the pick up means 21.

Figure 3C:
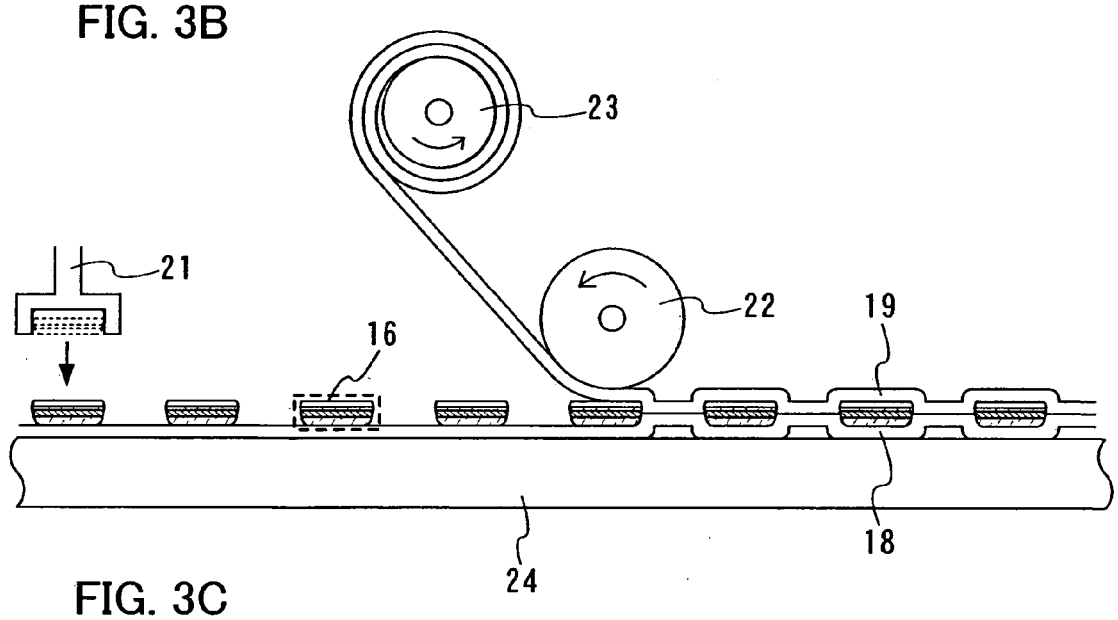

Next, the other surface of the laminated body 16 including an integrated circuit is attached to a second base 19 (FIG. 3C). This step is performed using a laminate device (an attachment device), and the laminate device has a supply roll 23 around which the second base 19 is rolled and a laminate roll 22 having one or both of a heat means and a pressure means. Then, the laminate treatment for the laminated body 16 including an integrated circuit is continuously performed by rotating sequentially the laminate roll 22 and the supply roll 23. Specifically, the other surface of the laminated body 16 including an integrated circuit is attached to the second base 19, and then, one or both of the heat treatment and the pressure treatment is performed to seal the laminated body 16 including an integrated circuit by the first base 18 and the second base 19.

As the first base 18 and the second base 19 used for sealing, a film to which antistatic treatment is applied (hereinafter, referred to as a "antistatic film"); a film made of polypropylene, polyester, vinyl, polyvinyl fluoride, vinyl chloride, or the like; paper of a fibrous material; a laminated film of a base film (polyester, polyamide, an inorganic vapor deposition film (a film having a surface on which an inorganic material such as silicon oxide or alumina is deposited), paper, or the like) and an adhesive synthetic resin film (an acrylic-based synthetic resin, an epoxy-based synthetic resin, or the like); or the like can be used. It is to be noted that, as the antistatic film, a film in which an antistatic material is dispersed in a resin, a film to which an antistatic material is attached, or the like can be given. In the film to which an antistatic material is attached, an antistatic material may be attached to one side or both sides. Further, in the film to which an antistatic material is attached to one side, a surface to which an antistatic material is attached may be attached to the inner side of the film or the outer side of the film. Furthermore, an antistatic material may be attached to entire surface of the film or part of the film. As an antistatic material, a metal such as aluminum, oxide containing indium and tin (ITO), metal salt amphoteric surfactant, imidazolin type amphoteric surfactant, a resin material containing a cross-linking copolymer high molecule having a carboxyl group and a quaternary ammonium base on a side chain, or the like can be given. By using an antistatic film as the first base 18 and the second base 19, the integrated circuits can be prevented from being affect due to static electricity from an outside.

The film is attached to the laminated body 16 including an integrated circuit by thermocompression (heat treatment and pressure treatment). In a case of performing the heat treatment and the pressure treatment, an adhesive layer provided on an uppermost surface of the film or a layer provided on a most external layer (not the adhesive layer) is melted by the heat treatment and attached by the pressure treatment. The adhesive layer may be provided on surfaces of the first base 18 and the second base 19 or it may not be provided. The adhesive layer corresponds to a layer containing an adhesive such as a heat curable resin, an ultraviolet-curable resin, an epoxy resin-based adhesive, or a resin additive. Further, a sheet material, which is used for sealing to prevent the moisture and the like from entering inside, is preferably coated with silica after sealing. For example, a sheet material in which an adhesive layer, a film such as polyester, and a silica coat are laminated can be used.

Hereinafter, the above laminate treatment is described more in detail. The laminate roll 22 and the supply roll 23 are sequentially rotated, and the supply roll 23 supplies the second base 19 to the laminate roll 22. The first base 18 provided with the laminated body 16 including a plurality of integrated circuits is sequentially conveyed by a conveying means 24. The laminate treatment corresponds to treatment where the laminated body 16 including an integrated circuit, the first base 18, and the second base 19 are subjected to one or both of the pressure treatment and the heat treatment by the laminate roll 22 and the conveying means 24 when the first base 18 to which the laminated body 16 including an integrated circuit is attached passes through the laminate roll 22 and the conveying means 24. When the laminate treatment is performed, the laminated body 16 including an integrated circuit is sealed with the first base 18 and the second base 19. It is to be noted that the conveying means 24 corresponds to a belt conveyor, a plurality of rollers or robot arms. Further, in a case of performing the heat treatment by the laminate roll 22 and the conveying roll 24, the laminate roll 22 has a heat means corresponding to a heater or oil of a heating wire, or the like.

Figure 3D:
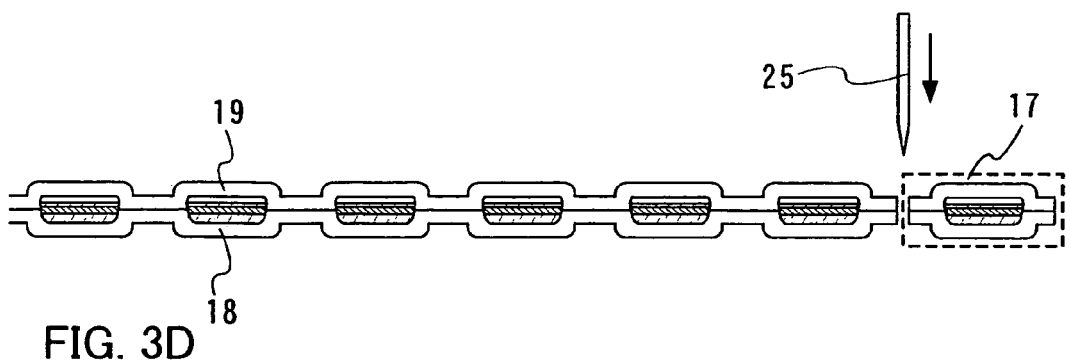

Subsequently, contact portions of the first base 18 and the second base 19 are cut off by a cutting means 25 (FIG. 3D). The cutting means 25 corresponds to a dicing machine, a laser, a wire saw, or the like. Through the above steps, a semiconductor device 17 (chip) is completed.

Next, the second method is described.

Figure 4A:
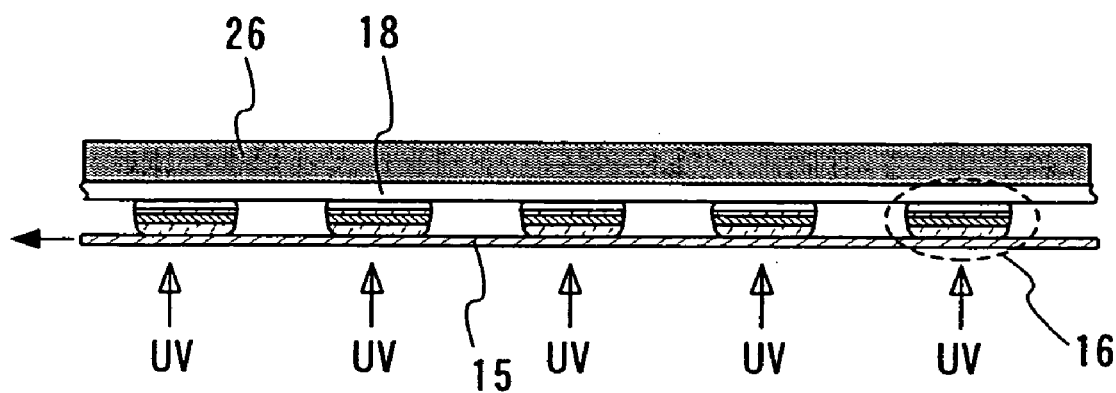
FIGS. 4A and 4B are views showing a method for manufacturing a semiconductor device of the present invention (Embodiment Mode 1).
Figure 4B:
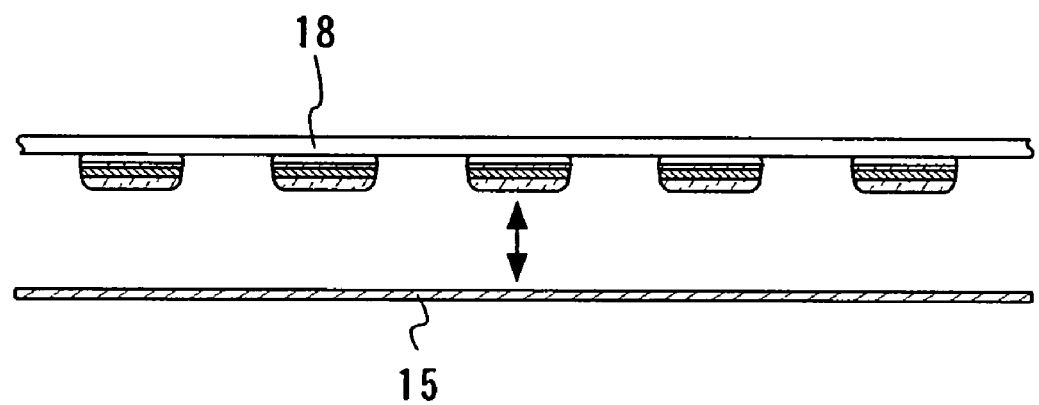

First, a first base 18 is provided to cover one surface of a laminated body 16 including an integrated circuit (FIG. 4A). Then, the first base 18 is heated by a heating means 26 so that the one surface of the laminated body 16 including an integrated circuit is attached to the first base 18. Subsequently, in order to separate the laminated body 16 including an integrated circuit from the film 15, the first base 18 to which the laminated body 16 including an integrated circuit is attached is separated from the film 15 (FIG. 4B).

Subsequently, the other surface of the laminated body 16 including an integrated circuit is attached to the second base 19, and the laminated body 16 including an integrated circuit is sealed with the first base 18 and the second base 19 (FIG. 3C). Then, contact portions of the first base 18 and the second base 19 are cut off (FIG. 3D). These steps may be conducted similarly to the above first method. Through the above steps, a semiconductor device 17 (chip) is completed.

In the above second method, after the film 15 is irradiated with light, the first base 18 is provided to cover the one surface of the laminated body 16 including an integrated circuit (FIG. 4A). However, the present invention is not limited to this order. After the first base 18 is provided to cover the one surface of the laminated body 16 including an integrated circuit and heated, the film 15 is irradiated with light so as to reduce adhesion between the film 15 and the laminated body 16 including an integrated circuit.

In the present embodiment, the laminated body 16 including an integrated circuit is sealed with the use of two films of the first base 18 and the second base 19; however, the laminated body 16 including an integrated circuit may be sealed with the use of only the first base 18. This is because the substrate 11 itself in the laminated body 16 including an integrated circuit has a function of preventing moisture or an impurity from entering from outside. Accordingly, a structure in which a surface of the insulating film 14 in the laminated body 16 including an integrated circuit (the element layer 13 in a case where the insulating film 14 is not provided) is covered with the first base 18, may be employed.

After forming an element layer over the substrate as described above, the substrate is thinned (ground and polished) to have a thickness of 2 μm or more and 50 μm or less, preferably, 4 μm or more and 30 μm or less and provided with curvature on edge faces. Therefore, a highly reliable semiconductor device can be manufactured. Further, a layer including a plurality of integrated circuits is divided into individual integrated circuits as well as the substrate is provided with curvature on the edge faces. Therefore, a highly reliable semiconductor device can be manufactured without increasing new steps.

Embodiment Mode 2

In the present embodiment mode, a method for manufacturing a semiconductor device of the present invention including a thin film transistor and an antenna will be described with reference to drawings. In particular, a structure of an element layer will be described in detail.

Figure 5A:
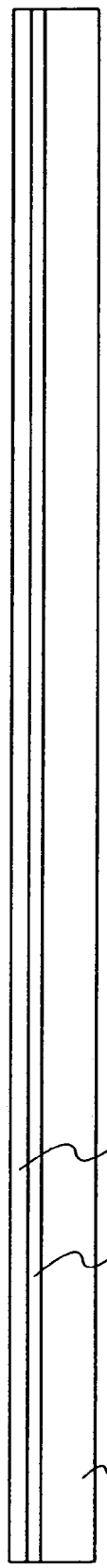
FIGS. 5A to 5C are views showing a method for manufacturing a semiconductor device of the present invention (Embodiment Mode 2).

First, a base film 703 is formed over a substrate 701 (FIG. 5A). As a material and a forming method of the substrate 701 and the base film 703, the material and the forming method described in Embodiment Mode 1 can be used; therefore, the description is omitted here.

Figure 5B:
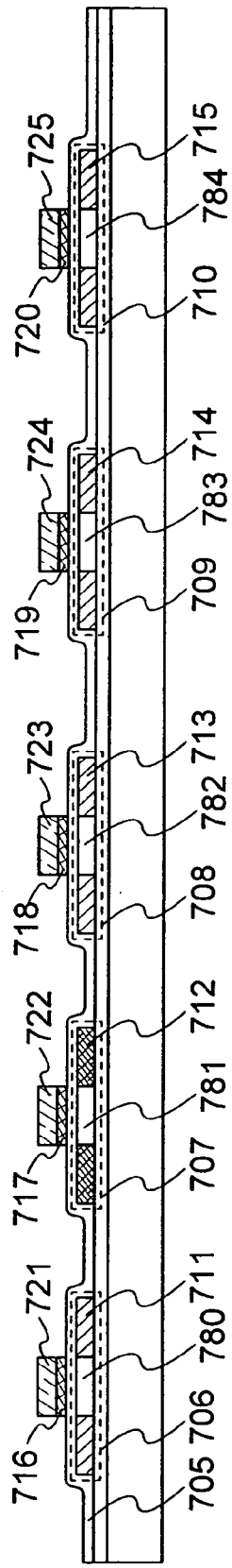

Next, an amorphous semiconductor film 704 (for example, a film containing mainly amorphous silicon) is formed over the base film 703. The amorphous semiconductor film 704 is formed by a sputtering method, various types of a CVD method such as a plasma CVD method or the like to have a thickness of 25 to 200 nm (preferably, 30 to 150 nm). Subsequently, the amorphous semiconductor film 704 is crystallized to form a crystalline semiconductor film. As a method for crystallization, laser crystallization, thermal crystallization using RTA or an annealing furnace, thermal crystallization using a metal element that promotes crystallization, laser crystallization combined with thermal crystallization using a metal element that promotes crystallization, or the like can be used. Thereafter, the obtained crystalline semiconductor film is patterned to form crystalline semiconductor films 706 to 710 (FIG. 5B). The base film 703 and the amorphous semiconductor film 704 can be formed continuously without being exposed to an atmosphere. It is to be noted that "patterning" in the present specification indicates etching by which an object is etched into a desired shape.

An example of a manufacturing step of the crystalline semiconductor films 706 to 710 is briefly described below. As a method for crystallizing an amorphous semiconductor film, laser crystallization, thermal crystallization using RTA or an annealing furnace, thermal crystallization using a metal element that promotes crystallization, laser crystallization combined with thermal crystallization using a metal element that promotes crystallization, or the like can be used. Further, as another method for crystallization, crystallization may be performed by generating thermal plasma by applying DC bias and making the thermal plasma affect a semiconductor film.

In the present embodiment mode, after forming the amorphous semiconductor film with a film thickness of 40 to 300 nm by a plasma CVD method, the amorphous semiconductor film is crystallized by heat treatment to form the crystalline semiconductor films 706 to 710. As the heat treatment, a laser heating furnace, laser irradiation, or irradiation of light emitted from a lamp instead of laser beam (hereinafter, referred to as lamp annealing), or a combination thereof can be used.

When laser irradiation is used, continuous-wave laser beam (CW laser beam) or pulsed laser beam (pulse laser beam) can be used. As usable laser beam, light emitted from one or plural kinds of a gas laser such as an Ar laser, a Kr laser, or an excimer laser; a laser using, as a medium, single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser, can be used. An object is irradiated with laser beam having a fundamental wave of such lasers or a second to a fourth harmonic of a fundamental wave to obtain a crystal with a large grain size. For example, the second harmonic (532 nm) or the third harmonic (355 nm) of an Nd:YVO$_4$ laser (a fundamental wave of 1064 nm) can be used. In this case, the energy density of about 0.01 to 100 MW/cm$^2$ (preferably, 0.1 to 10 MW/cm$^2$) is required for a laser. The scanning rate is approximately set to be 10 to 2000 cm/sec to irradiate the semiconductor film.

It is to be noted that each laser using, as a medium, single crystalline YAG, YVO$_4$, forsterite (Mg$_2$SiO$_4$), YAlO$_3$, or GdVO$_4$ or polycrystalline (ceramic) YAG, Y$_2$O$_3$, YVO$_4$, YAlO$_3$, or GdVO$_4$ doped with one or more of Nd, Yb, Cr, Ti, Ho, Er, Tm, and Ta as a dopant; an Ar ion laser; and a Ti:sapphire laser, can continuously oscillate. Further, pulse oscillation thereof can be performed with an oscillation frequency of 10 MHz or more by carrying out Q switch operation or mode synchronization. When a laser light is oscillated with an oscillation frequency of 10 MHz or more, a semiconductor film is irradiated with a next pulse during a period where the semiconductor film is melted by the laser and then is solidified. Therefore, differing from a case of using a pulse laser with a low oscillation frequency, a solid-liquid interface can be continuously moved in the semiconductor film so that crystal grains, which continuously grow toward a scanning direction, can be obtained.

When the amorphous semiconductor film is crystallized by using a continuous-wave laser or laser beam that oscillates at a frequency of 10 MHz or more as described above, a surface of the crystallized semiconductor film can be planarized. As a result, a gate insulating film 705, which will be formed later, can be formed thinly. In addition, this contributes to improve pressure resistance of the gate insulating film.

When ceramic (polycrystal) is used as a medium, the medium can be formed to have a free shape for a short time at low cost. When a single crystal is used, a columnar medium with several mm in a diameter and several tens of mm in a length is usually used. In the case of using the ceramic, a medium bigger than the case of using the single crystal can be formed.

A concentration of a dopant such as Nd or Yb in a medium, which directly contributes to light emission, cannot be changed largely in both cases of the single crystal and the polycrystal, and therefore, there is a limitation in improvement in output of a laser by increasing the concentration of the dopant to some extent. However, in the case of the ceramic, the size of a medium can be significantly increased as compared to the case of the single crystal, and therefore, drastic improvement in output of a laser can be expected.

Further, in the case of the ceramic, a medium with a parallelepiped shape or a rectangular parallelepiped shape can be easily formed. In a case of using a medium having such a shape, when oscillated light is made travel in a zig-zag manner inside the medium, a path of the oscillated light can be made long. Therefore, amplitude is increased and a laser can be oscillated at high output. Furthermore, a cross section of laser beam emitted from a medium having such a shape has a quadrangular shape, and therefore, as compared to a beam with a circular shape, the laser beam with the quadrangular shape in cross section have an advantage to be shaped into a linear beam. By shaping laser beam emitted in the above manner using an optical system, a linear beam with 1 mm or less in length of a short side and several mm to several m in length of a long side can be easily obtained. In addition, when a medium is uniformly irradiated with excited light, a linear beam is emitted with a uniform energy distribution in a long side direction.

When a semiconductor film is irradiated with this linear beam, the semiconductor film can be uniformly annealed. In a case where uniform annealing is required from one end to the other end of the linear beam, an arrangement in which slits are provided in both ends of the linear beam so as to shield an attenuated portion of energy of the linear beam, or the like may be performed.

When a semiconductor film is annealed by using the thus obtained linear beam with uniform intensity and a semiconductor device is manufactured by using this semiconductor film, a characteristic of the semiconductor device can be made favorable and uniform.

As thermal crystallization using a metal element that promotes crystallization, an example of a specific method is given. After keeping a solution containing nickel, which is a metal element that promotes crystallization, over an amorphous semiconductor film, the amorphous semiconductor film is subjected to dehydrogenation treatment (500° C. for one hour) and thermal crystallization treatment (550° C. for four hours) so as to form a crystalline semiconductor film. Thereafter, the crystalline semiconductor film is irradiated with laser beam as needed, and then, the crystalline semiconductor film is patterned by photolithography to form the crystalline semiconductor films 706 to 710.

The thermal crystallization method using a metal element that promotes crystallization has advantages of being capable of crystallizing an amorphous semiconductor film at a low temperature for a short time and aligning a direction of crystals; however, the thermal crystallization method has defects that off current is increased due to a remaining metal element in the crystalline semiconductor film and characteristics of the crystalline semiconductor film are not stabilized. Therefore, it is preferable to form an amorphous semiconductor film serving as a gettering site over the crystalline semiconductor film. Since the amorphous semiconductor film, which becomes the gettering site, is necessary to contain an impurity element such as phosphorus or argon, the amorphous semiconductor film is preferably formed by a sputtering method by which the amorphous semiconductor film can contain argon at a high concentration. Thereafter, heat treatment (RTA, thermal annealing using an annealing furnace, or the like) is performed to disperse the metal element in the amorphous semiconductor film. Subsequently, the amorphous semiconductor film containing the metal element is removed. By performing such the gettering process, the amount of the metal element contained in the crystalline semiconductor film can be reduced or the metal element can be removed.

Next, the gate insulating film 705 covering the crystalline semiconductor films 706 to 710 is formed. The gate insulating film 705 may be formed by a sputtering method or various types of a CVD method such as a plasma CVD method. Specifically, a silicon oxide film (a SiOx film), a silicon nitride film (a SiNx film), a silicon oxide film containing nitrogen (a SiO$_x$N$_y$ film) (x>y) (x and y are positive integers), and a silicon nitride film containing oxygen (a SiN$_x$O$_y$ film) (x>y) (x and y are positive integers) are formed as a single layer structure. Alternatively, these films are appropriately stacked to form the gate insulating film 705. Further, high-density plasma treatment is performed in an atmosphere containing oxygen, nitride, or oxygen and nitride with respect to the crystalline semiconductor films 706 to 710 so that surfaces of the crystalline semiconductor films 706 to 710 are oxidized or nitrided to form a gate insulating film. The gate insulating film formed by the high-density plasma treatment is superior in uniformity of a film thickness, film quality, and the like as compared to the film formed by a CVD method, or a sputtering method, or the like. In addition, a dense film can be formed.

In the present specification, "high-density plasma treatment" indicates treatment in which an electron density of plasma is $1\times10^{11}$ cm$^{-3}$ or more and $1\times10^{13}$ cm$^{-3}$ or less, and an electron temperature of plasma is 0.5 eV or more and 1.5 eV or less. Hereinafter in the present specificatoin, in a case of mentioning "high-density plasma treatment" as simply, plasma treatment is performed under the condition described above. Since an electron temprature in the vincity of an object (a metal film) formed over the substrate is low while an electron desity of plasma is high, damage of plasma to the substrate can be prevented. Further, since the electron density of plasma is high as $1\times10^{11}$ cm$^{-3}$ or more, a dense film with a uniform thickness of which oxide (or nitride) is formed by oxidation (or nitrogen) treatment, can be formed. Further, the electron temperature of plasma is low as 1.5 eV or less, and therefore, oxidation (or nitrogen) treatment can be performed at a lower temperature as compared to plasma treatment or thermal oxidation. For example, even when plasma treatment is performed at a temperature lower than a strain point of the glass substrate by about 100° C. or more (typically, 250 to 550° C.), plasma oxidation treatment (or plasma nitrogen treatment) can be sufficiently performed. As a power supply frequency for generating plasma, a microwave (2.45 GHz) is used. Further, potential of plasma is low as 5 V or less so that excessive dissociation of molecules of a raw material can be suppressed.

As an atmosphere containing oxygen, a mixed gas of a rare gas and oxygen ($O_2$), nitrogen dioxide ($NO_2$), or dinitrogen monoxide ($N_2O$); or a mixed gas of a rare gas, hydrogen ($H_2$), and oxygen ($O_2$), nitrogen dioxide ($NO_2$), or dinitrogen monoxide ($N_2O$) can be used. As a rare gas, argon (Ar), xenon (Xe), and krypton (Kr) can be given. A flow ratio (or a pressure ratio) of each gas contained in the mixed gas may be appropriately determined. As a combination example of a mixed gas, oxygen (or; nitrogen dioxide or dinitrogen monoxide) may be set to be 0.1 to 100 sccm, and argon may be set to be 100 to 5000 sccm. As another combination example of a mixed gas, oxygen (or; nitrogen dioxide or dinitrogen monoxide) may be set to be 0.1 to 100 sccm, and argon may be set to be 100 to 5000 sccm. The mixed gas is preferably introduced at a flow ratio of oxygen (or; nitrogen dioxide or dinitrogen monoxide):hydrogen:argon=1:1:100. For example, a mixed gas, in which oxygen (or; nitrogen dioxide or dinitrogen monoxide) is 5 sccm, hydrogen is 5 sccm, and argon is 500 sccm, may be introduced. Introducing hydrogen in a mixed gas is preferable since processing time of oxidation can be shortened.

As an atmosphere containing nitrogen, a mixed gas of a rare gas and nitrogen ($N_2$) or ammonia ($NH_3$); or a mixed gas of a rare gas, hydrogen ($H_2$) and nitrogen ($N_2$) or ammonia ($NH_3$) can be used. As a combination example of a mixed gas, nitrogen (or ammonia) may be set to be 20 to 2000 sccm, and argon may be set to be 100 to 10000 sccm. Further, as another combination example of a mixed gas, nitrogen (or ammonia) may be set to be 20 to 2000 sccm; hydrogen, 1 to 500 ccm, and argon, 100 to 10000 sccm. The mixed gas is preferably introduced at a flow ratio of nitrogen (or ammonia):hydrogen:argon=20:1:100. For example, a mixed gas, in which nitrogen (or ammonia) is 100 sccm, hydrogen is 5 sccm, and argon is 500 sccm, may be introduced. Introducing hydrogen into the mixed gas is preferable since processing time of nitriding can be shortened.

As an atmosphere containing oxygen and nitrogen, a mixed gas containing $O_2$, a rare gas and $N_2$ or $NH_3$ can be used. As a combination example of a mixed gas, nitrogen (or ammonia) may be set to be 20 to 1000 sccm, oxygen, 10 to 500 sccm, and argon, 100 to 5000 sccm. The mixed gas is preferably introduced at a flow ratio of nitrogen (or ammonia):oxygen:argon=2:1:10.

When the gate insulating film 705 is formed by the high-density plasma treatment, an insulating film with a thickness of 1 to 20 nm, typically, 5 to 10 nm, is formed over the crystalline semiconductor films 706 to 710. A reaction in this case is a solid-phase reaction, and therefore, interface state density between the insulating film and the crystalline semiconductor films 706 to 710 can be extremely reduced. Further, since the crystalline semiconductor films 706 to 710 can be directly oxidized or nitrided, ideally variations in a thickness of the gate insulating film 705 can be suppressed significantly. Furthermore, since strong oxidation is not generated in a crystal grain boundary of crystalline silicon, an extremely preferable state is made. That is, when each surface of the crystalline semiconductor films is subjected to solid-phase oxidation by the high-density plasma treatment shown here, an insulating film with low interface state density and favorable uniformity can be formed without generating extraordinary oxidation reaction in a crystal grain boundary.

It is to be noted that only an insulating film formed through the high-density plasma treatment may be used as the gate insulating film 705. Alternatively, the insulating film formed through the high-density plasma treatment and another insulating film including silicon oxide, silicon nitride containing oxygen, or silicon oxide containing nitrogen deposited by a CVD method utilizing plasma or a thermal reaction may be stacked to form the gate insulating film 705. In either case, when a transistor is formed to have a gate insulating film, which partly or entirely includes an insulating film formed by high-density plasma, variations in characteristics can be reduced.

Further, the crystalline semiconductor films 706 to 710 formed by crystallizing the amorphous semiconductor film 704 by irradiation of a continuous-wave laser or laser beam oscillated at a frequency of 10 MHz or more while scanning the amorphous semiconductor film 704 with the laser beam in one direction, have a characteristic that crystals grow in a scanning direction of the laser beam. Therefore, when a transistor is arranged such that the scanning direction corresponds to a channel length direction (a direction of flowing carries when a channel formation region is formed) and the gate insulating film 705 formed by the high-density plasma treatment is combined with the transistor, a transistor with less variations in characteristics and high electron field-effect mobility can be obtained.

Next, a first conductive film and a second conductive film are formed by stacking over the gate insulating film 705. The first conductive film and the second conductive film may be formed by a sputtering method or various types of a CVD method such as a plasma CVD method. In the present embodiment mode, the first conductive film is formed to have a thickness of 20 to 100 nm, and the second conductive film is formed to have 100 to 400 nm. Further, the first conductive film and the second conductive film can be formed by using an element selected from tantalum (Ta), tungsten (W), titanium (Ti), molybdenum (Mo), aluminum (Al), copper (Cu), chromium (Cr), niobium (Nb), or the like; or an alloy material or a compound material mainly containing these elements. Further, the first and second conductive films can be formed by using a semiconductor material typified by polycrystalline silicon doped with an impurity element such as phosphorus.

As a combination example of the first conductive film and the second conductive film, a tantalum nitride (TaN) film and a tungsten (W) film; a tungsten nitride (WN) film and a tungsten film; a molybdenum nitride (MoN) film and a molybdenum (Mo) film; or the like can be given. Since tungsten and tantalum nitride have high heat resistance properties, after forming the first and second conductive films using tungsten or tantalum nitride, heat treatment for thermal activation can be performed. Further, a single layer structure or a three layer structure may be employed instead of the two layer structure of the first and second conductive films. In a case of a single layer structure or a three layer structure, it is possible to select freely a material as similar to the material of the above first and second conductive films as a material of the conductive film.

Next, a mask is formed using a resist by photolithography. Etching treatment is performed with the use of the mask for forming gate electrodes and gate wirings so as to form conductive films 716 to 725 serving as a gate electrode (hereinafter, they may be called "gate electrode" in the present specification).

Next, after forming the mask using a resist by photolithography, an impurity element imparting N-type conductivity is added to the crystalline semiconductor films 706 and 708 to 710 at a low concentration by an ion doping method or an ion implantation method. In such a manner, N-type impurity regions 711 and 713 to 715 and channel formation regions 780 and 782 to 784 are formed. As an impurity element imparting N-type conductivity, an element belonging to Group 15 of the periodic table may be used, and for example, phosphorus (P) or arsenic (As) is used.

Next, a mask is formed using a resist by photolithography. An impurity element imparting P-type conductivity is added to the crystalline semiconductor film 707 with the use of the mask, and a P-type impurity region 712 and a channel formation region 781 are formed. As the impurity element imparting P-type conductivity, for example, boron (B) is used. As an order of forming the N-type impurity regions 711 and 713 to 715 and the P-type impurity region 712, after forming the N-type impurity regions 711 and 713 to 715, the P-type impurity region 712 may be formed in the same as the present embodiment mode. Alternatively, after the P-type impurity region 712 is formed, the N-type impurity regions 711 and 713 to 715 may be formed.

Figure 5C:
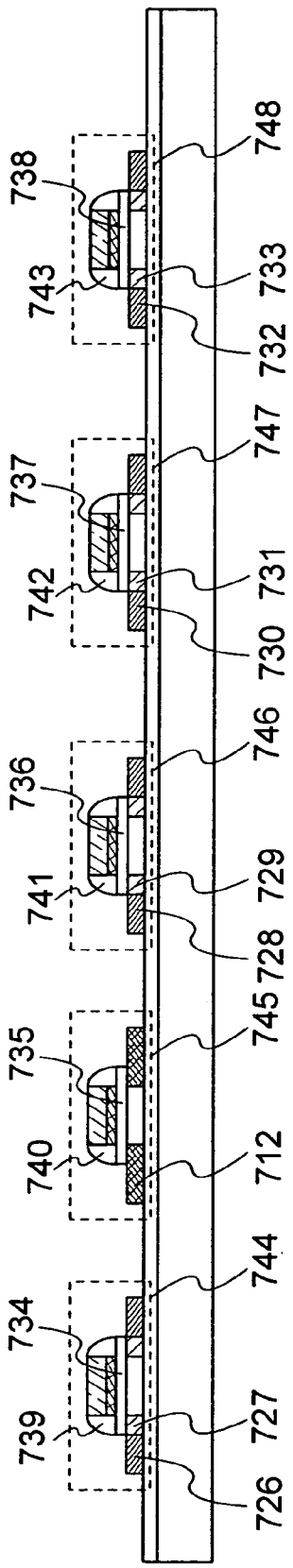

Next, an insulating film is formed to cover the gate insulating film 705 and the conductive films 716 to 725. The insulating film is formed using a single layer or a stacked layer of a film made of an inorganic material such as silicon, silicon oxide, silicon nitride; or a film made of an organic material such as an organic resin by a sputtering method or a various types of a CVD method such as a plasma CVD method. Then, the insulating film is selectively etched by anisotropic etching in mainly a perpendicular direction to form insulating films (also called sidewalls) 739 to 743 in contact with side surfaces of the conductive films 716 to 725 (FIG. 5C). At the same time of forming the insulating films 739 to 743, insulating films 734 to 738 are formed by etching the gate insulating film 705. The insulating films 739 to 743 will be used as masks for doping when an LDD (lightly doped drain) region is formed.

Next, an impurity element imparting N-type conductivity is added to the crystalline semiconductor films 706 and 708 to 710 using a mask made of a resist by photolithography and the insulating films 739 to 743 as masks to form first N-type impurity regions (also called LDD regions) 727, 729, 731, and 733; and second N-type impurity regions 726, 728, 730, and 732. A concentration of the impurity element contained in the first N-type impurity regions 727, 729, 731, and 733 is lower than a concentration of the impurity element contained in the second N-type impurity regions 726, 728, 730, and 732. Through the above steps, N-type thin film transistors 744 and 746 to 748 and a P-type thin film transistor 745 are completed.

In order to form an LDD region, a technique in which a gate electrode having a stacked layer structure of two layers or more is formed, etching by which the gate electrode is tapered or anithotropic etching is performed, and a conducitve film of a lower layer of the gate electrode is used as a mask; and a technique in which an insulating film of a sidewall is used as a mask, can be employed. A thin film transistor formed by using the former technique has a structure where an LDD region is overlapped with the gate electrode with the gate insulating film interposed therebetween. However, since the etching by which the gate electrode is tapered or the anisotropic etching is used in this structure, it is difficult to control a width of the LDD region, and therefore, an LDD region sometimes cannot be formed without a proper etching step. On the other hand, the latter technique using the insulating film of the sidewall as a mask can control a width of an LDD region more easily as compared to the former technique, so that the LDD region can be certainly formed. It is to be noted that "the etching by which the gate electrode is tapered" indicates etching by which a side surface of the gate electrode is made to have a tapered shape.

After removing a natural oxidization film, which is formed over exposed surfaces of the N-type impurity regions 726, 728, 730, and 732 and the P-type impurity region 712, silicide regions may be appropriately formed by using a metal film. As the metal film, a film made from nickel, titanium, cobalt, or platinum; a film made from an alloy containing at least two kinds of these elements; or the like can be used. Specifically, a nickel film is used as the metal film, for example. The nickel film is formed by a sputtering method at power of 500 W to 1 kW under a room temperature, and then, a silicide region is formed by heat treatment. The heat treatment can employ RTA, an annealing furnace, or the like. In this case, by controlling a film thickness of the metal film, a heating temperature, and a heating time, silicide regions may be formed only on the surfaces of the N-type impurity regions 726, 728, 730, and 732 and the P-type impurity region 712. Alternatively, a silicide region can be entirely formed the N-type impurity regions 726, 728, 730, and 732 and the P-type impurity region 712. Then, nickel, which is unreacted, is removed. For example, the unreacted nickel is removed by using an etching solution of $HCl:HNO_3:H_2O=3:2:1$.

It is to be noted that the present embodiment mode shows an example in which the thin film transistors 744 to 748 are of a top-gate type; however, it is obvious that each of the thin film transistors may be a bottom-gate thin film transistor. Further, a single gate structure in which a single channel formation region is formed in each of the thin film transistors 744 to 748, is described in the present embodiment mode; however, a double gate structure in which two channel formation regions are formed in each of the thin film transistors or a triple gate structure in which three channel formation regions are formed in each of the thin film transistors may be employed. Moreover, a dual gate structure having two gate electrodes that are arranged over and under a channel formation region through a gate insulating film, or other structure may be employed.

A structure of a semiconductor film forming each of the thin film transistors 744 to 748 may employ other structure than the structures described in the present embodiment mode. For example, an impurity region (including a source region, a drain region, and a LDD region) may be formed respectively. Alternatively, a P-channel TFT, an N-channel TFT, or a CMOS circuit may be formed. Further, an insulating film (a sidewall) may be formed to be in contact with side surfaces of a gate electrode that is provided over or under the semiconductor film.

After completing the N-type thin film transistors 744 and 746 to 748 and the P-type thin film transistor 745 through the above steps, heat treatment for recovering crystallinity of the semiconductor films or activating the impurity elements added to the semiconductor films, may be performed. Furtehr, after performing the heat treatment, the exposed gate insulating film 705 is preferably subjected to high-density plasma treatment in an atmosphere containing hydrogen so that a surface of the gate insulating film 705 may contain hydrogen. This is because the hydrogen can be used when perforimng a step of hydrogenating the semiconducotr film later. Further, by performing high-density plasma treatment in an atmosphere containing hydrogen while heaeting the substrate at 350 to 450° C., hydrogenation of the semiconductor film can be performed. Further, as the atmosphere containing hydrogen, a mixed gas of a rare gas (for example, argon (Ar)) and hydrogen ($H_2$) or ammonia ($NH_3$) can be used. When a mixed gas of a rare gas (for example, argon (Ar)) and ammonia ($NH_3$) is used as the atmosphere containing hydrogen, the surface of the gate insulating film 705 can be hydrogenated and nitrided at the same time.

Figure 6A:
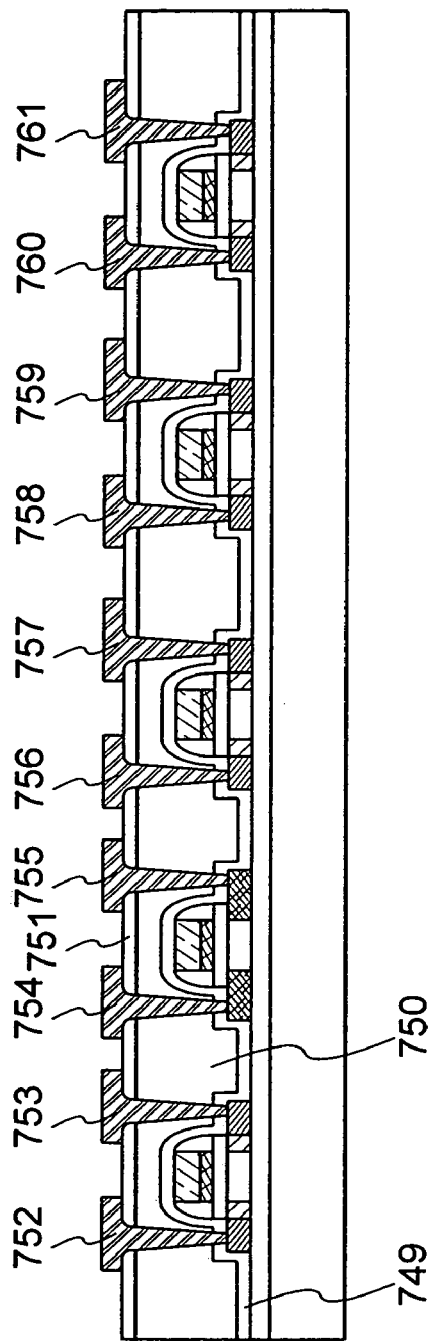
FIGS. 6A and 6B are views showing a method for manufacturing a semiconductor device of the present invention (Embodiment Mode 2).

Then, a single layer or a stacked layer of an insulating film is formed to cover the thin film transistors 744 to 748 (FIG. 6A). The insulating film covering the thin film transistors 744 to 748 is formed using a signle layer or a stacked layer made from an inorganic material such as silicon oxide or silicon nitride, an organic material such as polyimide, polyamide, benzocychlobutene, acrylic, epoxy, or siloxane, or the like, by an SOG method, a droplet discharing method, or the like. In the present specification, siloxane has a skeleton structure including silicon (Si)-oxygen (O) bonds and an organic group containing at least hydrogen (for example, an alkyl group, or aromatic hydrocarbon) is used as a substituent. Further, as the substituent, a fluoro group may be used, or both of an organic group containing at least hydrogen and a fluoro group may be used. For example, in a case where the insulating film covering the thin film transistors 744 to 748 has a three layer structure, a film mainly containing silicon oxide may be formed as a first insulating film 749, a film mainly containing a resin may be formed as a second insulating film 750, and a film mainly containing silicon nitride may be formed as a third insulating film 751. Further, in a case where the insulating film covering the thin film transistors 744 to 748 has a single layer structure, a silicon nitride film or a silicon nitride film containing oxygen may be formed. In this case, it is preferable that by performing high-density plasma treatment in an atmosphere containing hydrogen with respect to the silicon nitride film or the silicon nitride film containing oxygen, hydrogen is contained in a surface of the silicon nitride film or the silicon nitride film containing oxygen. This is because the hydrogen can be utilized when perforimng a step of hydrogenating the semiconducotr films later. Further, by performing high-density plasma treatment in an atmosphere containing hydrogen while heating the substrate at 350 to 450° C., hydrogenation of the semiconductor film can be performed. As the atmosphere containing hydrogen, a mixed gas of a rare gas (for example, argon (Ar)) and hydrogen ($H_2$) or ammonia ($NH_3$) can be used. When a mixed gas of a rare gas (for example, argon (Ar)) and ammonia ($NH_3$) is used as the atmosphere containing hydrogen, the surface of the gate insulating film 705 can be hydrogenated and nitrided at the same time.

Prior to forming the insulating films 749 to 751, or after forming one or a plurality of thin films of the insulating films 749 to 751, heat treatment for recovering crystallinity of the semiconductor films, activating the impurity elements added to the semiconductor films, or hydrogenating the semiconductor films, may be performed. The heat treatment may use thermal annealing, laser annealing, RTA, or the like. For example, in order to activate the impurity elements, thermal annealing at 500° C. or more may be performed. Further, in order to hydrogenate the semiconductor films, thermal annealing at 350 to 450° C. may be performed.

Next, the insulating films 749 to 751 are etched by photolithography to form contact holes through which the N-type impurity regions 726, 728, 730, and 732 and the P-type impurity region 712 are exposed. Subsequently, a conductive film is formed to fill the contact holes. The conductive film is patterned to form conductive films 752 to 761 each serving as a source wiring or a drain wiring.

The conductive films 752 to 761 are formed by using a conductive film mainly containing aluminum (Al) by a sputtering method, various types of a CVD method such as a plasma CVD method, or the like. The conductive film mainly containing aluminum (Al) corresponds to a material mainly containing aluminum, which also contains nickel, or an alloy material mainly containing aluminum, which also contains nickel and one or both of carbon and silicon, for example. Since the conductive film mainly containing aluminum generally has a drawback of a poor heat resistance property, the conductive film mainly containing aluminum is preferably sandwiched between barrier films. The barrier films indicate films having a function of suppressing heroic or improving a heat resistance property of the conductive film mainly containing aluminum. As a material having such a function, chromium, tantalum, tungsten, molybdenum, titanium, silicon, and nickel, or nitride of these elements can be given.

As an example of a structure of each of the conductive films 752 to 761, a structure in which a titanium film, an aluminum film, and another titanium film are sequentially stacked from a substrate side, can be given. Since titanium is an element having a high reducing property, even when a thin natural oxide film is formed on the crystalline semiconductor films, the natural oxide film can be reduced by the titanium so as to make good contact with the crystalline semiconductor films. Further, the titanium film formed between the crystalline semiconductor films and the aluminum film, is preferably subjected to high-density plasma treatment in an atmosphere containing nitrogen to nitride a surface of the titanium film. As the atmosphere containing nitrogen, a mixed gas of a rare gas and $N_2$ or $NH_3$, or a mixed gas of $N_2$ or $NH_3$, a rare gas, and $H_2$ can be used. Nitriding the surface of the titanium film makes it possible to prevent alloying of titanium and aluminum and prevent aluminum from dispersing in the crystalline semiconductor films through the titanium film in a subsequent heat treatment or the like. It is to be noted that an example of sandwiching the aluminum film with the titanium films is described here, and this is the same for a case of using chromium films, tungsten films, or the like instead of the titanium films. More preferably, formation of a titanium film, nitriding treatment of the surface of the titanium film, formation of the aluminum film, and formation of another titanium film are successively carried out by using a multi-chamber apparatus without exposing these films to atmospheric air.

Figure 6B:
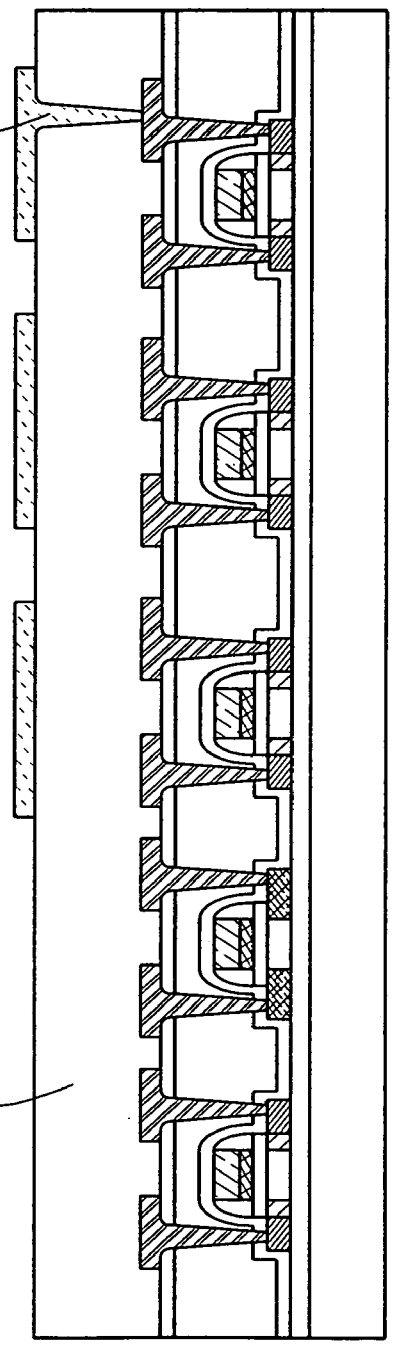

Next, an insulating film 762 is formed to cover the conductive films 752 to 761 (FIG. 6B). The insulating film 762 is formed to have a single layer or a stacked layer using an inorganic material or an organic material by a SOG method, a droplet discharging method, or the like. In the present embodiment mode, the insulating film 762 is formed to have a thickness of 0.75 to 3 μm.

Next, the insulating film 762 is etched by photolithography to form a contact hole that exposes the conductive film 761. Subsequently, a conductive film 763 is formed to fill a top surface of the insulating film 762 and the contact hole. The conductive film 763 serves as an antenna; therefore, it is sometimes mentioned as "antenna" below. It is to be noted that the conductive film 763 is not limited to a single layer structure, and a stacked layer structure may be also employed.

A shape of the conductive film 763 serving as an antenna is described. A semiconductor device (an RFID tag) having an antenna (the conductive film 763) and being capable of non-contact communicating data can use an electromagnetic coupling type, an electromagnetic induction type, a micro-wave type, or the like, as a transmission system of a signal. The transmission system may be appropriately selected by a practitioner in consideration of use application, and in accordance with the transmission system, an optimum antenna may be appropriately provided.

For example, when an electromagnetic coupling type or an electromagnetic induction type (for example, 13.56 MHz band) is applied as the transmission system of a signal in the semiconductor device, a conductive film serving as an antenna is formed to be in a circular shape (for example, a loop antenna) or in a spiral shape so as to utilize an electromagnetic induction due to change of density of a magnetic field.

When a micro-wave type (for example, an UHF band (860 to 960 MHz band), 2.45 GHz band, or the like) is applied as the transmission system of a signal in the semiconductor device, a shape of length or the like of the conductive layer serving as an antenna may be appropriately set in consideration of a wavelength of an electromagnetic wave used for transmission of a signal. For example, the conductive film 763 can be formed in a liner shape (for example, a dipole antenna) or a flat shape (for example, a patch antenna). Further, a shape of the conductive film 763 is not limited to a straight line, and a curve, a serpentine shape, or a shape of combining thereof may be employed in consideration of the wavelength of the electromagnetic wave.

Next, a method for forming the conductive film 763 serving as an antenna and a material thereof is described. As a method for forming the conductive film 763, a CVD method, a sputtering method, a printing method such as a screen printing method or a gravure printing method, a droplet discharging method, a dispenser method, a plating method, or the like can be used. Further, as a material of the conductive film 763, an element selected from aluminum (Al), titanium (Ti), silver (Ag), copper (Cu), gold (Au), platinum (Pt), nickel (Ni), palladium (Pd), tantalum (Ta), or molybdenum (Mo); or an alloy material or a compound material containing mainly these materials can be used. Alternatively, a fine particle containing mainly solder (preferably, Pb-free solder) may be used. In this case, a fine particle of which a grain size is 20 μm or less is preferably used. Solder has an advantage of low cost. Further, ceramic, ferrite, or the like can be applied to the antenna.

For example, when the conductive film 763 is formed using a screen printing method, the conductive film 763 can be provided by selectively printing a conductive paste in which a conductive particle of which a grain size is several nm to several tens of μm is dissolved or dispersed in an organic resin. As a conductive particle, one or more of a metal particle of silver (Ag), gold (Au), copper (Cu), nickel (Ni), platinum (Pt), palladium (Pd), tantalum (Ta), molybdenum (Mo), or titanium (Ti); a fine particle of silver halide; a dispersive nanoparticle can be used. Further, an organic resin contained in the conductive paste, one or a plurality of organic resins serving as a binder, a solvent, a dispersive agent, and a coating material of the metal particle can be used. Typically, an organic resin such as an epoxy resin or a silicon resin can be given. When forming the conductive film 763, it is preferable that baking is performed after the conductive paste is extruded. For example, in the case of using a fine particle containing mainly silver (for example, the grain size is 1 nm or more but 100 nm or less) as a material of the conductive paste, the conductive film 763 can be formed by which the conductive particle is baked at the temperature range of 150 to 300° C. and be cured.

When the electromagnetic coupling type or the electromagnetic induction type is applied and a semiconductor device (an RFID tag) having an antenna is provided in contact with a metal, it is preferable to provide a magnetic material with permeability between the semiconductor device and the metal. In a case where the semiconductor device with the antenna is provided in contact with the metal, an eddy current flows in the metal corresponding to change of the magnetic field, and the change of the magnetic field is lowered due to the eddy current; thereby reducing a communication distance. Therefore, the eddy current of the metal can be suppressed and the reduction of the communication distance can be suppressed by providing a material with permeability between the semiconductor device and the metal. It is to be noted that ferrite with high permeability and little damage of a high frequency or a thin metal film can be used as the magnetic material.

Through the above steps, an element layer is completed.

Figure 7:
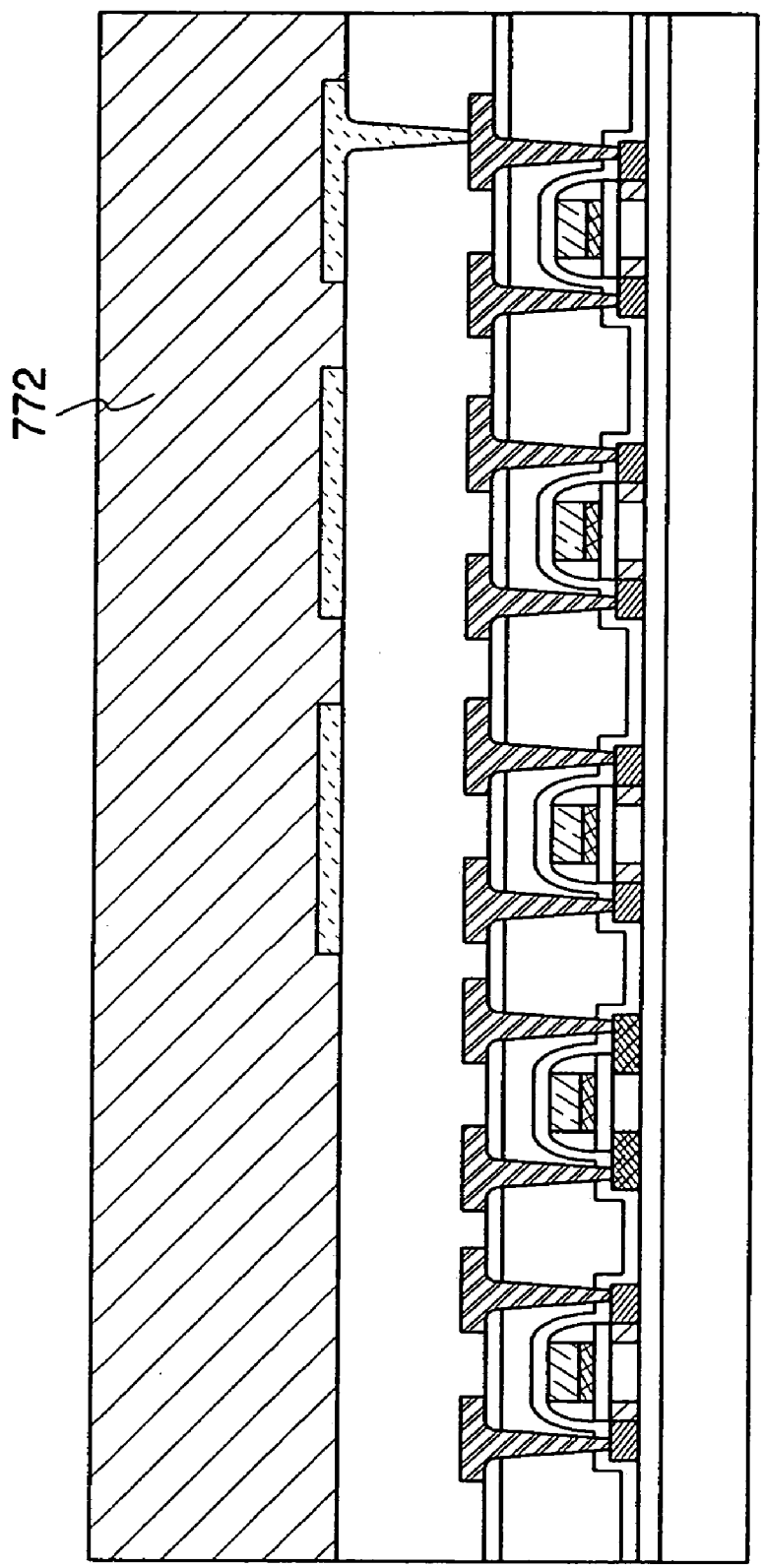
FIG. 7 is a view showing a method for manufacturing a semiconductor device of the present invention (Embodiment Mode 2).

Next, an insulating film 772 is formed by a SOG method, a droplet discharging method, or the like to cover the conductive film 763 serving as an antenna (FIG. 7). The insulating layer 772 serves as a protective layer for securing intensity of the element layer. The insulting layer 772 is preferably formed to cover the base film 703 and the side surfaces of the element layer. In the present embodiment mode, the insulating layer 772 is provided to cover entirely the base film 703 and the element layer; however, it is not necessary to be provided entirely and may be provided selectively. Further, in a structure where the insulating film 772 is not provided, the present invention can be implemented.

The insulating film 772 may be formed using a film containing carbon such as DLC (diamond like carbon), a silicon oxide film containing nitrogen, a silicon nitride film containing oxygen, a film made of an organic material (for example, a film made of a resin material such as epoxy), or the like. As a method for forming the insulating film 772, a sputtering method, various types of a CVD method such as a plasma CVD method, a spin coating method, a droplet discharging method or a screen printing method can be employed.

Hereinafter, the method described in Embodiment Mode 1 can be applied to steps after forming the insulating film 772 (the protective layer) for forming a semiconductor device (a chip); therefore, the description is omitted here.

The present embodiment mode can be implemented by freely combining the above embodiment mode. That is, the material and the forming method shown in the above embodiment mode can be also utilized in the present embodiment mode, and the material and the forming method shown in the present embodiment mode can be utilized in the above embodiment mode.

Embodiment Mode 3

In the present embodiment mode, a method for forming an antenna that is different from the method described in Embodiment Mode 2. In other words, in the Embodiment Mode 2, the structure where the antenna is formed as a part of the element layer is described; however, in the present embodiment mode, a substrate provided with an antenna is prepared differently, and a structure where the substrate provided with the antenna and a substrate provided with an element layer are attached with each other will be described.

First, as described in Embodiment Mode 2, up to the conductive film 763 is formed over the substrate 701 (FIG. 6B). The steps up to forming the conductive film 763 are described in Embodiment Mode 2; therefore, the description thereof is omitted here.

Figure 8:
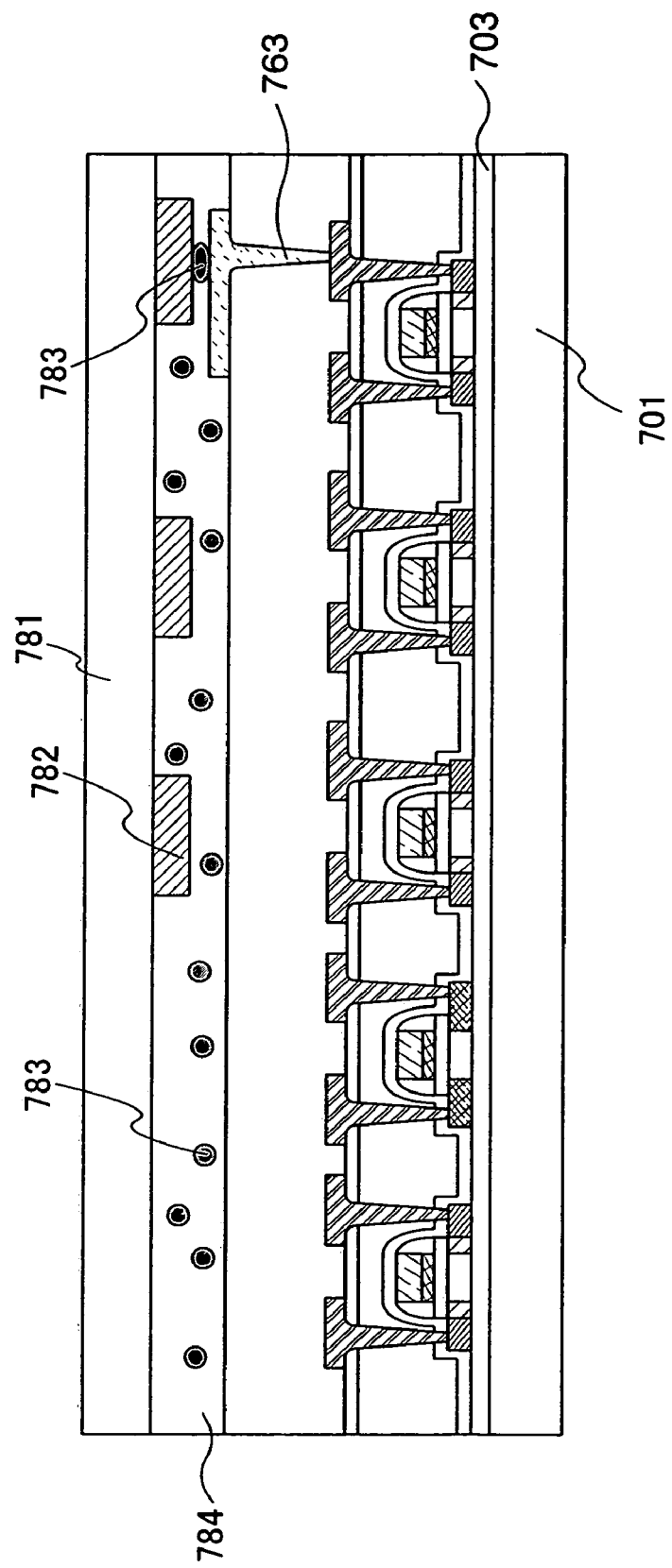
FIG. 8 is a view showing a method for manufacturing a semiconductor device of the present invention (Embodiment Mode 3).

Next, a substrate 781 provided with an antenna 782 and the substrate 701 provided with the element layer are attached with each other (FIG. 8). In FIG. 8, as a means for attachment, an anisotropic conductive material is used. The anisotropic conductive material includes a conductive particle 783 and fluid. The fluid is baked and cured to be an attachment layer 784. The conductive film 763 and the antenna 782 have electrical continuity by compressing the conductive particle 783. In other regions, since the conductive particle 783 keeps a sufficient gap with the insulating film 762 and the antenna 782, electrical connection is not produced. It is to be noted that, in addition to the attachment method by using the anisotropic conductive material, a method for bonding metals by an ultrasonic wave (called "ultrasonic bonding"), or an attachment method by using an ultraviolet curing resin, a two-sided tape, or the like can be used. Further, as the substrate 781 provided with the antenna 782, a film made of polypropylene, polyester, vinyl, polyvinyl fluoride, vinyl chloride or the like; paper made of a fibrous material; or the like can be used.

Next, the substrate that is attached is irradiated with laser beam from one surface of the substrate 781 (a surface of an opposite side to which a surface is attached to the substrate 701) to form an opening portion having curvature. The opening portion is provided to prevent a thin film transistor forming the element layer, the antenna 782, and the like, or provided in edge faces of the substrate 701. In the present invention, the opening portion is formed so that a part of one surface of the substrate 701 is opened, and it is important that the opening portion formed in the substrate 701 has curvature.

A condition of laser beam is not particularly limited, and preferably, laser beam of which an absorption coefficient to a material used for the base film 703 and the element layer is large is used.

Hereinafter, as thinning (grinding and polishing), and cutting off steps of the substrate 701, the method described in Embodiment Mode 1 can be applied to manufacture a semiconductor device (chip) having curvature in edge faces of the substrate; therefore the description thereof is omitted here. Thereafter, sealing treatment is performed as needed.

Figure 9:
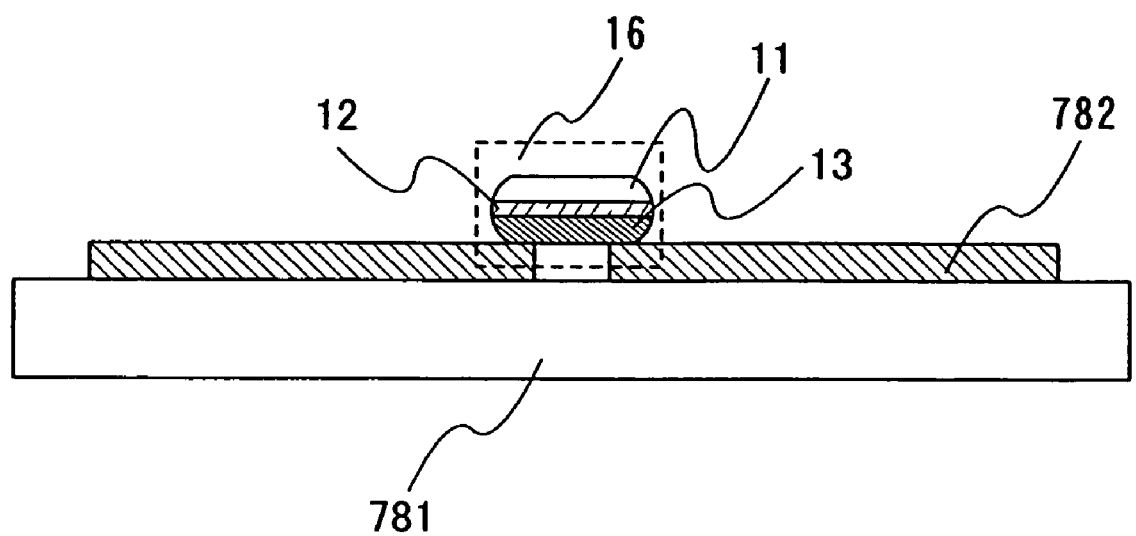
FIG. 9 is a view showing a method for manufacturing a semiconductor device of the present invention (Embodiment Mode 3).

In the present embodiment mode, the element layer is formed over the substrate 701, and the substrate 781 provided with the antenna 782 and the substrate 701 provided with the element layer are attached with each other before dividing into a chip; however, the present invention is not limited to this method. For example, the element layer 13 is formed over the substrate 11 and divided into a chip to form a laminated body 16 including an integrated circuit. Then, an element constituting the integrated circuit that is provided in the laminated body 16 including an integrated circuit and the substrate 781 provided with the antenna 782 are connected to manufacture a semiconductor device (a chip) (FIG. 9). Thereafter, sealing treatment is performed as needed. Since the semiconductor device (the chip) manufactured in such a manner has curvature in edge faces of the laminated body 16 including an integrated circuit, stress added to a connecting portion of the antenna 782 and the laminated having an integrated circuit 16 in the case of bending the semiconductor device (the chip) is relieved, and contact failure is not easily caused.

The present embodiment mode can be implemented by freely combining with the above embodiment modes. That is, the material and the forming method shown in the above embodiment modes can be also used in the present embodiment mode, and the material and the forming method shown in the present embodiment mode can be also used in the above embodiment modes.

Embodiment Mode 4

In the present embodiment mode, an embodiment mode in a case where a semiconductor device of the present invention is utilized as an RFID tag capable of non-contact transmitting and receiving of data will be described with the reference to FIGS. 10A to 10C.

Figure 10A:
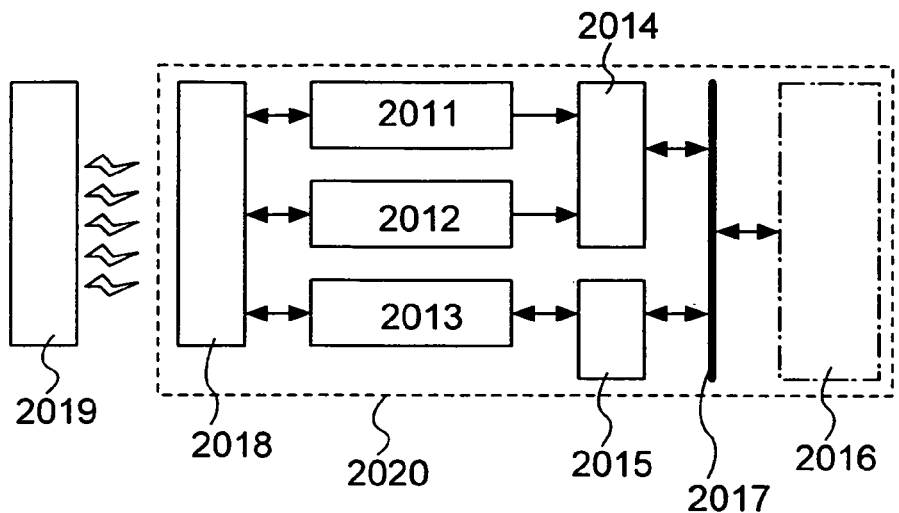
FIGS. 10A to 10C are a diagram and views explaining a mode of using a semiconductor device of the present invention (Embodiment Mode 4).
Figure 10B:
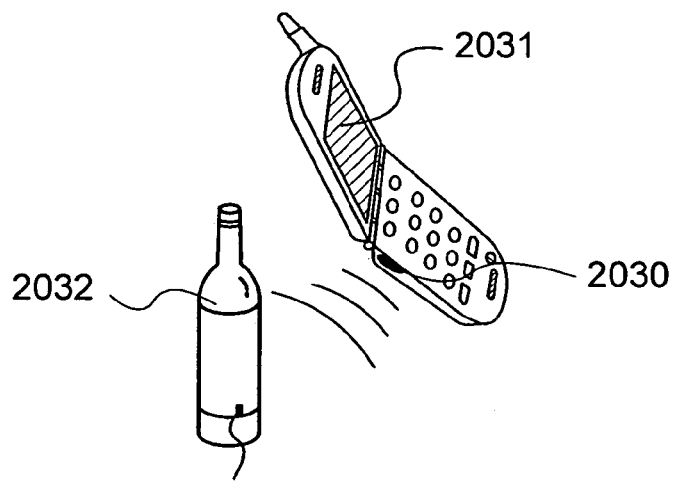
Figure 10C:
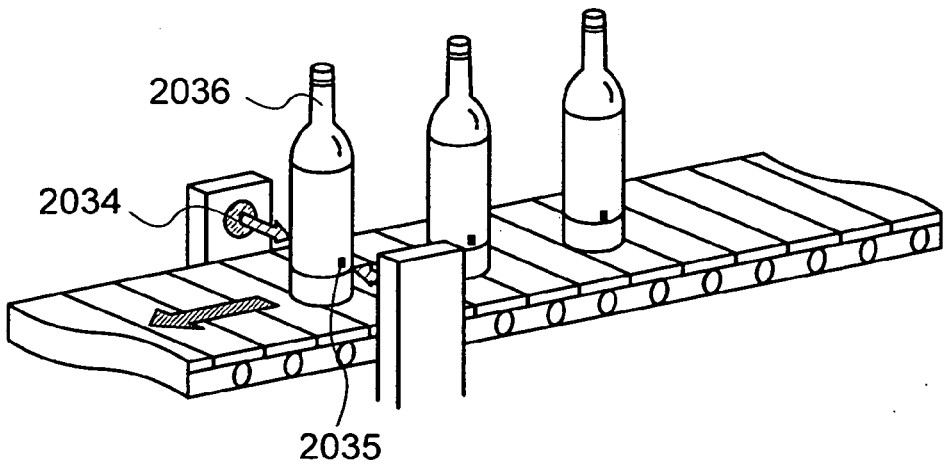

An RFID tag 2020 has a function of non-contact communicating of data, and includes a power supply circuit 2011, a clock generation circuit 2012, a data modulation/demodulation circuit 2013, a control circuit 2014 that controls other circuits, an interface circuit 2015, a memory 2016, a data bus 2017, and an antenna (antenna coil) 2018 (FIG. 10A).

The power supply circuit 2011 is a circuit that generates various types of electric power supply supplied to each circuit in the semiconductor device, based on an alternating current signal inputted from the antenna 2018. The clock generation circuit 2012 is a circuit that generates various types of a clock signal supplied to each circuit in the semiconductor device, based on the alternating current signal inputted from the antenna 2018. The data demodulation/modulation 2013 has a function of demodulating/modulating data communicating with the reader/writer 2019. The control circuit 2014 has a function of controlling the memory 2016. The antenna 2018 has a function of transmitting and receiving an electromagnetic wave. The reader/writer 2019 controls and communicates with the semiconductor device and controls treatment related to data thereof. It is to be noted that the RFID tag is not limited to the above structure, and a structure where another element, for example, a limiter circuit of a power supply voltage or hardware dedicated to encryption process, is added may be employed.

Further, the RFID tag may supply a power supply voltage to each circuit by an electric wave without mounting electric power supply (battery); supply a power supply voltage to each circuit with electric power supply (battery) mounted instead of an antenna; or supply a power supply voltage by an electric wave and electric power supply.

In a case where a semiconductor device of the present invention is utilized for an RFID tag or the like, the semiconductor device has advantages that non-contact communication is possible; multiple reading is possible; writing of data is possible; processing into various shapes is possible; directivity is wide and a wide recognition range is provided depending on the selected frequency; and the like. The RFID tag can be applied to an IC tag that can identify individual information of a person or an article with non-contact wireless communication, a label that can be attached to an object by label processing, a wristband for an event or an amusement, or the like. In addition, the RFID tag may be processed with a resin material or may be directly fixed to a metal obstructing wireless communication. Further, the RFID tag can be utilized for the operation of a system such as an entering-leaving management system or a checkout system.

Next, one mode of using the semiconductor device of the present invention as an RFID tag is described. A reader/writer 2030 is provided on a side surface of a portable terminal including a display portion 2031, and an RFID tag 2033 is provided on a side surface of an article 2032 (FIG. 10B). The RFID tag 2033 manufactured by the present invention has flexibility and curvature on edge faces. Therefore, the RFID tag can be easily provided on a curved surface of the article 2032, and a structure in which the RFID is hardly peeled off can be obtained. When the reader/writer 2030 is held to the RFID tag 2033 provided on the article 2032, information of the article, such as a raw material and a place of origin of the article, a test result in each production process, a history of distribution process, or further, description of the product is displayed on the display portion. When an article 2036 is transported by a belt conveyer, inspection of the article 2036 can be performed by using a reader/writer 2034 and an RFID tag 2035 provided on the article 2036 (FIG. 10C). The RFID tag 2035 manufactured by the present invention has flexibility and curvature on edge faces. Therefore, the RFID tag can be easily provided on a curved surface of the article 2036, and a structure in which the RFID tag is hardly peeled off can be obtained. In such a manner, by utilizing an RFID tag for a system, information can be easily obtained, and high functions and high added values are realized.

The present embodiment mode can be implemented by freely combining with the above embodiment modes.

Embodiment Mode 5

A semiconductor device of the present invention can be utilized as an RFID tag. For example, the semiconductor device can be used by providing an RFID tag manufactured by the present invention on paper money, coin, securities, certificates, bearer bonds, packing containers, documents, recording media, commodities, vehicles, foods, garments, health articles, livingwares, medicines, electronic devices, and the like. Specific examples thereof are described with reference to FIGS. 11A to 11H. It is to be noted that the RFID tag is denoted by reference a numeral 2720 in FIGS. 11A to 11H. The RFID tag manufactured by the present invention has flexibility and curvature in edge faces. Therefore, the RFID tag can be easily provided on goods having various shapes as shown in FIGS. 11A to 11H, and a structure in which the RFID tag is hardly peeled off can be obtained. Further, the RFID tag is made to be thin, and thus, attractive design of goods is not damaged.

Figure 11A:
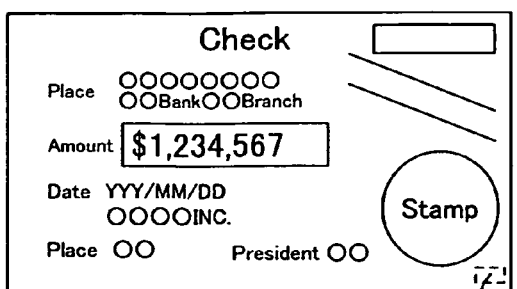
FIGS. 11A to 11H are views explaining a mode of using a semiconductor device of the present invention (Embodiment Mode 5).
Figure 11B:
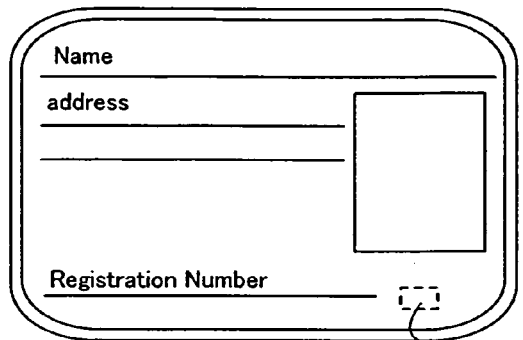
Figure 11C:
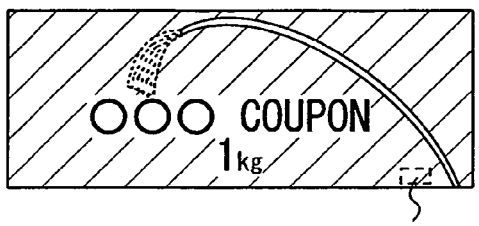
Figure 11D:
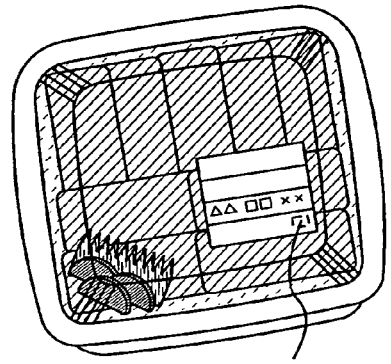
Figure 11E:
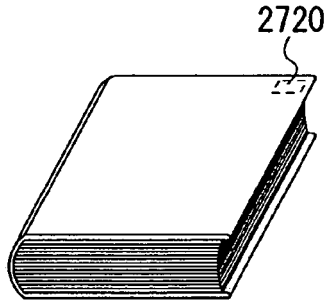
Figure 11F:
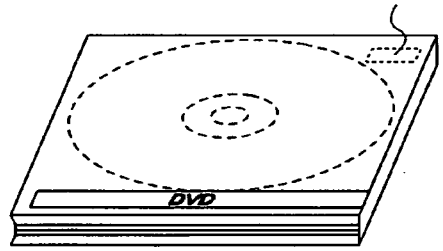
Figure 11G:
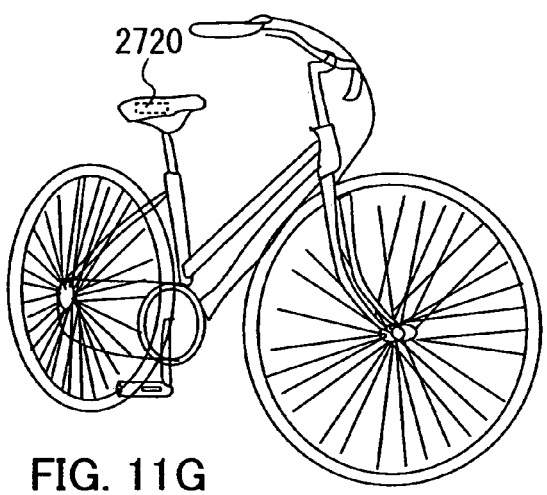
Figure 11H:
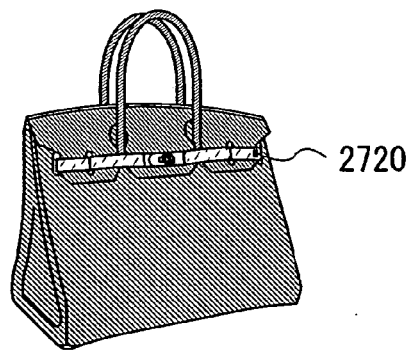

The paper money and coins are money distributed in the market and includes currency (cash vouchers) available in a certain area in a similar way to money, memorial coins, and the like. The securities refer to checks, stock certificates, promissory notes, and the like (FIG. 11A). The certificates refer to driver's licenses, certificates of residence, and the like (FIG. 11B). The bearer bonds refer to stamps, rice coupons, various merchandise coupons, and the like (FIG. 11C). The packing containers refer to wrapping paper for a box lunch or the like, plastic bottles, and the like (FIG. 11D). The documents refer to volumes, books, and the like (FIG. 11E). The recording media refer to DVD software, video tapes, and the like (FIG. 11F). The vehicles refer to wheeled vehicles such as bicycles, vessels, and the like (FIG. 11G). The commodities refer to bags, glasses, and the like (FIG. 11H). The foods refer to eatables, drinks, and the like. The garments refer to clothes, chaussures, and the like. The health articles refer to medical appliances, health appliances, and the like. The livingwares refer to furniture, lighting equipment, and the like. The medicines refer to medical products, pesticides, and the like. The electronic devices refer to liquid crystal display devices, EL display devices, television devices (TV sets or flat-screen TV sets), cellular phones, and the like.

Counterfeits can be prevented by providing an RFID tag on the paper money, coin, securities, certificates, bearer bonds, and the like. The efficiency of an inspection system or a system used in a rental shop can be improved by providing an RFID tag on packing containers, documents, recording media, commodities, foods, livingwares, electronic devices, and the like. By providing an RFID tag on each of the vehicles, health articles, medicines, and the like, counterfeits or theft can be prevented. Further, in the case of providing the RFID tag on medicines, medicines can be prevented from being taken mistakenly. The RFID tag is provided on goods by being attached on their surfaces or embedded thereinto. For example, the RFID tag may be embedded in paper in the case of a book or embedded in an organic resin in the case of a package formed of the organic resin.

In such a manner, the efficiency of an inspection system, a system used in a rental shop, or the like can be improved by providing an RFID tag on packing containers, recording media, commodities, foods, garments, livingwares, electronic devices, and the like. Counterfeits or theft can be prevented by providing an RFID tag on vehicles. Individual creatures can be easily identified by implanting an RFID tag in creatures such as animals. For example, year of birth, sex, breed, and the like can be easily identified by implanting an RFID tag in creatures such as domestic animals.

As described above, the semiconductor device of the present invention can be used by being provided in any goods as far as they are goods. The present embodiment mode can be implemented by freely combining with the above embodiment modes.

This application is based on Japanese Patent Application serial no. 2005-192484 filed in Japan Patent Office on Jun. 30, 2005, the entire contents of which are hereby incorporated by reference.

What is claimed is:

1. A method for manufacturing a semiconductor device, comprising the steps of:
   forming an element layer including a plurality of integrated circuits over one surface of a substrate;
   forming a hole having curvature in part of the one surface side of the substrate;
   thinning the substrate;
   forming a laminated body including an integrated circuit by cutting off the substrate so that a cross section of the substrate has curvature corresponding to a portion where the hole is formed.

2. A method for manufacturing a semiconductor device, comprising the steps of:
   forming an element layer including a plurality of integrated circuits over one surface of a substrate;
   forming a hole having curvature in part of the one surface side of the substrate;
   grinding the other surface of the substrate;
   polishing the other surface of the substrate after grinding the other surface of the substrate; and forming a laminated body including an integrated circuit by cutting off the substrate so that a cross section of the substrate has curvature corresponding to a portion where the hole is formed.

3. A method for manufacturing a semiconductor device, comprising the steps of:
forming an element layer including a plurality of integrated circuits over one surface of a, substrate;
forming a hole having curvature in the element layer so that part of the substrate is exposed;
grinding the other surface of the substrate;
polishing the other surface of the substrate after grinding the other surface of the substrate; and
forming a laminated body including an integrated circuit by cutting off the substrate so that a cross section of the substrate has curvature corresponding to a portion where the hole is formed.

4. A method for manufacturing a semiconductor device, comprising the steps of:
forming an element layer including a plurality of integrated circuits over one surface of a substrate;
forming a hole having curvature in part of one surface side of the substrate by laser irradiation from a top surface of the element layer;
grinding the other surface of the substrate;
polishing the other surface of the substrate after grinding the other surface of the substrate; and
forming a laminated body including an integrated circuit by cutting off the substrate so that a cross section of the substrate has curvature, which is polished, corresponding to a portion where the hole is formed.

5. A method for manufacturing a semiconductor device, comprising the steps of:
forming an element layer including a plurality of integrated circuits over one surface of a substrate;
forming a hole having curvature in part of one surface side of the substrate;
grinding the other surface of the substrate;
polishing the other surface of the substrate after grinding the other surface of the substrate; and
forming a laminated body including an integrated circuit by cutting off the substrate so that a cross section of the substrate has curvature by laser irradiation from the other surface of the substrate, which is polished, corresponding to a portion where the hole is formed.

6. A method for manufacturing a semiconductor device, comprising the steps of:
forming an element layer including a plurality of integrated circuits over one surface of a substrate;
forming a hole having curvature in part of one surface side of the substrate by laser irradiation from a top surface of the element layer;
grinding the other surface of the substrate;
polishing the other surface of the substrate after grinding the other surface of the substrate; and
forming a laminated body including an integrated circuit by cutting off the substrate so that a cross section of the substrate has curvature by laser irradiation from the other surface of the substrate, which is polished, corresponding to a portion where the hole is formed.

7. A method for manufacturing a semiconductor device, comprising the steps of:
forming an element layer including a plurality of integrated circuits over one surface of a substrate;
forming a hole having curvature in part of one surface side of the substrate by laser irradiation from a top surface of the element layer;
grinding the other surface of the substrate;
polishing the other surface of the substrate after grinding the other surface of the substrate;
forming a laminated body including an integrated circuit by cutting off the substrate so that a cross section of the substrate has curvature by laser irradiation from the other surface of the substrate, which is polished, corresponding to a portion where the hole is formed; and
sealing both sides of the laminated body with two films having flexibility.

8. A method for manufacturing a semiconductor device according to claim 4, wherein the laser is an ultraviolet laser.

9. A method for manufacturing a semiconductor device according to claim 5, wherein the laser is an ultraviolet laser.

10. A method for manufacturing a semiconductor device according to claim 6, wherein the laser is an ultraviolet laser.

11. A method for manufacturing a semiconductor device according to claim 7, wherein the laser is an ultraviolet laser.

12. A method for manufacturing a semiconductor device according to claim 2, wherein the cross section of the substrate, which is polished, is convex.

13. A method for manufacturing a semiconductor device according to claim 3, wherein the cross section of the substrate, which is polished, is convex.

14. A method for manufacturing a semiconductor device according to claim 4, wherein the cross section of the substrate, which is polished, is convex.

15. A method for manufacturing a semiconductor device according to claim 5, wherein the cross section of the substrate, which is polished, is convex.

16. A method for manufacturing a semiconductor device according to claim 6, wherein the cross section of the substrate, which is polished, is convex.

17. A method for manufacturing a semiconductor device according to claim 7, wherein the cross section of the substrate, which is polished, is convex.

18. A method for manufacturing a semiconductor device according to claim 1, wherein a thickness of the substrate, which is polished, is 2 µm or more and 50 µm or less.

19. A method for manufacturing a semiconductor device according to claim 2, wherein a thickness of the substrate, which is polished, is 2 µm or more and 50 µm or less.

20. A method for manufacturing a semiconductor device according to claim 3, wherein a thickness of the substrate, which is polished, is 2 µm or more and 50 µm or less.

21. A method for manufacturing a semiconductor device according to claim 4, wherein a thickness of the substrate, which is polished, is 2 µm or more and 50 µm or less.

22. A method for manufacturing a semiconductor device according to claim 5, wherein a thickness of the substrate, which is polished, is 2 µm or more and 50 µm or less.

23. A method for manufacturing a semiconductor device according to claim 6, wherein a thickness of the substrate, which is polished, is 2 µm or more and 50 µm or less.

24. A method for manufacturing a semiconductor device according to claim 7, wherein a thickness of the substrate, which is polished, is 2 µm or more and 50 µm or less.

25. A method for manufacturing a semiconductor device according to claim 1, wherein the element layer has an antenna.

26. A method for manufacturing a semiconductor device according to claim 2, wherein the element layer has an antenna.

27. A method for manufacturing a semiconductor device according to claim 3, wherein the element layer has an antenna.

28. A method for manufacturing a semiconductor device according to claim 4, wherein the element layer has an antenna.

29. A method for manufacturing a semiconductor device according to claim 5, wherein the element layer has an antenna.

30. A method for manufacturing a semiconductor device according to claim 6, wherein the element layer has an antenna.

31. A method for manufacturing a semiconductor device according to claim 7, wherein the element layer has an antenna.

* * * * *